United States Patent
Ugawa et al.

(10) Patent No.: US 10,505,195 B2
(45) Date of Patent: Dec. 10, 2019

(54) METHOD FOR PRODUCING ELECTRICAL STORAGE DEVICE ELECTRODE WITH BINDER COMPOSITION

(71) Applicant: JSR CORPORATION, Minato-ku (JP)

(72) Inventors: Shinsaku Ugawa, Minato-ku (JP); Tatsuaki Honda, Minato-ku (JP); Yoshiharu Otsuka, Minato-ku (JP); Takuya Nakayama, Minato-ku (JP); Daisuke Sukeguchi, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 15/323,452

(22) PCT Filed: Jun. 23, 2015

(86) PCT No.: PCT/JP2015/068030
§ 371 (c)(1),
(2) Date: Jan. 3, 2017

(87) PCT Pub. No.: WO2016/002586
PCT Pub. Date: Jan. 7, 2016

(65) Prior Publication Data
US 2017/0149064 A1 May 25, 2017

(30) Foreign Application Priority Data

Jul. 4, 2014 (JP) ................................ 2014-138192

(51) Int. Cl.
| | | |
|---|---|---|
| *H01M 4/04* | (2006.01) | |
| *H01M 4/62* | (2006.01) | |
| *C09D 7/40* | (2018.01) | |
| *H01G 11/38* | (2013.01) | |
| *C09D 5/24* | (2006.01) | |
| *C09D 109/06* | (2006.01) | |
| *C09D 133/12* | (2006.01) | |
| *C09D 133/20* | (2006.01) | |
| *C09D 151/06* | (2006.01) | |
| *H01G 11/28* | (2013.01) | |
| *H01G 11/86* | (2013.01) | |
| *H01M 10/0525* | (2010.01) | |

(52) U.S. Cl.
CPC ............. *H01M 4/623* (2013.01); *C09D 5/24* (2013.01); *C09D 7/67* (2018.01); *C09D 109/06* (2013.01); *C09D 133/12* (2013.01); *C09D 133/20* (2013.01); *C09D 151/06* (2013.01); *H01G 11/28* (2013.01); *H01G 11/38* (2013.01); *H01G 11/86* (2013.01); *H01M 4/0404* (2013.01); *H01M 4/621* (2013.01); *H01M 4/622* (2013.01); *H01M 10/0525* (2013.01); *Y02E 60/13* (2013.01)

(58) Field of Classification Search
CPC .... H01M 4/0404; H01M 4/621; H01M 4/622; H01M 4/623; H01M 10/0525; H01G 11/28; H01G 11/38; H01G 11/86; C09D 7/1266; C09D 151/06
USPC ......................................................... 427/115
See application file for complete search history.

(56) References Cited

U.S. PATENT DOCUMENTS

| | | | | |
|---|---|---|---|---|
| 2004/0009397 | A1* | 1/2004 | Kim ......................... | C08F 14/18 429/217 |
| 2004/0043294 | A1* | 3/2004 | Fukui ....................... | B22F 7/08 429/235 |
| 2004/0234850 | A1 | 11/2004 | Watarai et al. | |
| 2007/0054190 | A1* | 3/2007 | Fukui .................. | H01M 4/0471 429/218.1 |
| 2010/0216032 | A1* | 8/2010 | Baba ..................... | H01M 4/366 429/322 |
| 2011/0171526 | A1 | 7/2011 | Wakizaka et al. | |
| 2011/0236763 | A1* | 9/2011 | Noda .................... | H01M 2/162 429/248 |
| 2013/0004827 | A1* | 1/2013 | Miyazaki ............ | H01M 2/0217 429/145 |
| 2013/0052530 | A1 | 2/2013 | Kitaguchi et al. | |
| 2013/0266843 | A1* | 10/2013 | Hara ..................... | H01M 4/136 429/149 |
| 2014/0050981 | A1* | 2/2014 | Kang .................... | H01M 4/366 429/211 |
| 2015/0140424 | A1* | 5/2015 | Ma ........................ | H01M 4/622 429/217 |
| 2015/0213968 | A1 | 7/2015 | Kitaguchi et al. | |

FOREIGN PATENT DOCUMENTS

| | | |
|---|---|---|
| CN | 1467258 A | 1/2004 |
| CN | 1280930 C | 10/2006 |
| CN | 1929167 A | 3/2007 |
| CN | 102201559 A | 9/2011 |
| CN | 103872373 A | 6/2014 |

(Continued)

OTHER PUBLICATIONS

International Search Report dated Sep. 8, 2015 in PCT/JP2015/068030 filed Jun. 23, 2015.

(Continued)

*Primary Examiner* — Brian K Talbot

(74) *Attorney, Agent, or Firm* — Oblon, McClelland, Maier & Neustadt, L.L.P.

(57) ABSTRACT

The present invention provides an electrical storage device binder composition that can produce an electrode that achieves improved charge-discharge characteristics. The composition includes a polymer (A) and a liquid medium (B), and further includes particles having a particle size of 10 to 50 micrometers in a number of 1,000 to 100,000 per mL.

6 Claims, No Drawings

(56) References Cited

FOREIGN PATENT DOCUMENTS

| | | |
|---|---|---|
| JP | 2002-75332 A | 3/2002 |
| JP | 2002-260637 A | 9/2002 |
| JP | 2005-183142 A | 7/2005 |
| JP | 2007-26752 A | 2/2007 |
| JP | 2008-146894 A | 6/2008 |
| JP | 2011/76917 A | 4/2011 |
| JP | 4957932 B1 | 6/2012 |
| TW | 567630 | 12/2003 |
| WO | 2010/032784 A1 | 3/2010 |
| WO | 2012/066911 A1 | 5/2012 |
| WO | 2013/077212 A1 | 5/2013 |

OTHER PUBLICATIONS

Japanese Office Action dated Nov. 25, 2015 in Japanese Application No. 2015-549700 (with Computer Generated English Machine Translation).
Taiwanese Office Action 104121685 dated Jun. 26, 2018 (with Machine Translation).
The First Office Action dated Sep. 4, 2018 in Chinese Patent Application No. 201580036033.4 with Computer-generated English translation.
Taiwanese Office Action dated Oct. 4, 2018 in Patent Application No. 104121685 (with unedited computer generated English translation), 6 pages.
The Second Office Action dated Feb. 27, 2019 in Chinese Patent Application No. 201580036033.4 with English translation.
The Third Office Action issued Aug. 22, 2019 in Chinese Patent Application No. 201580036033.4 with computer-generated English translation citing documents AO and AP, 17 pages.

\* cited by examiner

METHOD FOR PRODUCING ELECTRICAL STORAGE DEVICE ELECTRODE WITH BINDER COMPOSITION

TECHNICAL FIELD

The present invention relates to an electrical storage device binder composition.

BACKGROUND ART

In recent years, it has been desired to further reduce the size of an electrical storage device. It is indispensable to reduce the thickness of each element (e.g., positive electrode and negative electrode) of the electrical storage device in order to reduce the size of the electrical storage device. However, when the thickness of each element is reduced, the interval between the positive electrode and the negative electrode decreases, and a fatal defect may occur due to a small foreign substance. Patent Literature 1 to 3 propose a foreign substance detection method and a foreign substance removal method in order to suppress the occurrence of a fatal defect due to a small foreign substance, and improve the yield of the electrical storage device.

CITATION LIST

Patent Literature

PTL 1: JP-A-2005-183142
PTL 2: WO2010/032784
PTL 3: WO2012/0066911

SUMMARY OF INVENTION

Technical Problem

However, known technology such as that disclosed in Patent Literature 1 to 3 is influenced by a preconception that large particles derived from a foreign substance should be thoroughly removed. Several aspects of the invention were conceived against such a preconception. Specifically, several aspects of the invention provide an electrical storage device binder composition that can produce an electrode that achieves improved charge-discharge characteristics by intentionally incorporating a predetermined amount of particles having a predetermined particle size in the binder composition instead of removing particles from the binder composition.

Solution to Problem

The invention was conceived in order to solve at least some of the above problems, and may be implemented as described below (see the following aspects and application examples).

APPLICATION EXAMPLE 1

According to one aspect of the invention, an electrical storage device binder composition includes a polymer (A) and a liquid medium (B),
the composition further including particles having a particle size of 10 to 50 micrometers in a number of 1,000 to 100,000 per mL.

APPLICATION EXAMPLE 2

In the electrical storage device binder composition according to Application Example 1, the polymer (A) may include a repeating unit (Mb) derived from an unsaturated carboxylic acid ester.

APPLICATION EXAMPLE 3

In the electrical storage device binder composition according to Application Example 1 or 2, the polymer (A) may be a fluorine-containing polymer that includes a repeating unit (Ma) derived from a fluorine-containing ethylene-based monomer.

APPLICATION EXAMPLE 4

In the electrical storage device binder composition according to Application Example 1 or 2, the polymer (A) may be a diene-based polymer that includes a repeating unit (Md) derived from a conjugated diene compound, a repeating unit (Me) derived from an aromatic vinyl compound, and a repeating unit (Mc) derived from an unsaturated carboxylic acid.

APPLICATION EXAMPLE 5

In the electrical storage device binder composition according to Application Example 3 or 4, the fluorine-containing polymer or the diene-based polymer may be in the form of particles having an average particle size of 50 to 400 nm, and the particles may be dispersed in the liquid medium (B).

APPLICATION EXAMPLE 6

According to another aspect of the invention, a method for producing an electrical storage device electrode includes:
providing an electrode slurry that includes a polymer (A), a liquid medium (B), particles having a particle size of 10 to 50 micrometers, and an electrode active material, the electrode slurry including the particles having a particle size of 10 to 50 micrometers in a number of 1,000 to 100,000 per mL;
applying the electrode slurry to the surface of a collector; and
drying the electrode slurry that has been applied to the surface of the collector.

APPLICATION EXAMPLE 7

In the method for producing an electrical storage device electrode according to Application Example 6, the polymer (A) may include a repeating unit (Mb) derived from an unsaturated carboxylic acid ester.

APPLICATION EXAMPLE 8

In the method for producing an electrical storage device electrode according to Application Example 6 or 7, the polymer (A) may be a fluorine-containing polymer that includes a repeating unit (Ma) derived from a fluorine-containing ethylene-based monomer.

APPLICATION EXAMPLE 9

In the method for producing an electrical storage device electrode according to Application Example 6 or 7, the polymer (A) may be a diene-based polymer that includes a repeating unit (Md) derived from a conjugated diene compound, a repeating unit (Me) derived from an aromatic vinyl compound, and a repeating unit (Mc) derived from an unsaturated carboxylic acid.

APPLICATION EXAMPLE 10

In the method for producing an electrical storage device electrode according to Application Example 8 or 9, the fluorine-containing polymer or the diene-based polymer may be in the form of particles having an average particle size of 50 to 400 nm, and the particles may be dispersed in the liquid medium (B).

Advantageous Effects of Invention

The electrical storage device binder composition according to one aspect of the invention makes it possible to produce an electrical storage device electrode that exhibits excellent charge-discharge characteristics. It is considered that the electrical storage device electrode exhibits excellent charge-discharge characteristics since the particles having a predetermined particle size are included in the composition in a predetermined ratio, and the electron conductivity of the electrode is improved. An electrical storage device that includes an electrical storage device electrode produced using the electrical storage device binder compositions according to one aspect of the invention has an excellent capacity retention ratio, and can prevent a decrease in voltage during storage at a high temperature.

DESCRIPTION OF EMBODIMENTS

The exemplary embodiments of the invention are described in detail below. Note that the invention is not limited to the following exemplary embodiments. It is intended that the invention includes various modifications that can be implemented without departing from the scope of the invention. The term "(meth)acrylic acid" used herein includes "acrylic acid" and "methacrylic acid". The term "(meth)acrylate" used herein includes "acrylate" and "methacrylate".

1. ELECTRICAL STORAGE DEVICE BINDER COMPOSITION

An electrical storage device binder composition according to one embodiment of the invention includes a polymer (A) and a liquid medium (B), the composition including particles having a particle size of 10 to 50 micrometers in a number of 1,000 to 100,000 per mL. It is preferable that the polymer (A) include a repeating unit (Mb) derived from an unsaturated carboxylic acid ester so that an electrode active material layer exhibits improved adhesion. Each component included in the electrical storage device binder composition according to one embodiment of the invention is described in detail below.

1.1. Polymer (A)

The polymer (A) included in the electrical storage device binder composition according to one embodiment of the invention may be dissolved in the liquid medium (B), or may be dispersed in the liquid medium (B) in the form of particles (i.e., the electrical storage device binder composition may be a latex). It is preferable that the polymer (A) be dispersed in the liquid medium (B) in the form of particles (i.e., the electrical storage device binder composition be a latex). When the electrical storage device binder composition is a latex, an electrode slurry that is prepared by mixing the electrical storage device binder composition with an electrode active material exhibits excellent stability and excellent applicability to a collector. The polymer (A) that is dispersed in the liquid medium (B) in the form of particles may be hereinafter referred to as "polymer particles (A)".

1.1.1. Repeating Unit (Mb) Derived from Unsaturated Carboxylic Acid Ester

It is preferable that the polymer (A) used in connection with one embodiment of the invention include the repeating unit (Mb) derived from an unsaturated carboxylic acid ester. A polymer that includes the repeating unit (Mb) derived from an unsaturated carboxylic acid ester normally exhibits excellent adhesion.

The unsaturated carboxylic acid ester is preferably a (meth)acrylic acid ester ((meth)acrylate). Specific examples of the (meth)acrylic acid ester include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, n-octyl (meth)acrylate, nonyl (meth)acrylate, decyl (meth)acrylate, hydroxymethyl (meth)acrylate, hydroxyethyl (meth)acrylate, hydroxybutyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, and the like. The (meth)acrylic acid ester may be one or more compounds selected from these compounds. It is preferable that the (meth)acrylic acid ester be one or more compounds selected from methyl (meth)acrylate, ethyl (meth)acrylate, 2-ethylhexyl (meth)acrylate, hydroxymethyl (meth)acrylate, and hydroxyethyl (meth)acrylate. It is particularly preferable that the (meth)acrylic acid ester be one or more compounds selected from methyl (meth)acrylate, hydroxymethyl (meth)acrylate, and hydroxyethyl (meth)acrylate.

The polymer (A) used in connection with one embodiment of the invention may be a polymer that includes only the repeating unit (Mb) derived from an unsaturated carboxylic acid ester, or may include a structural unit derived from an additional copolymerizable unsaturated monomer (described later) in addition to the repeating unit (Mb) derived from an unsaturated carboxylic acid ester.

The content of the repeating unit (Mb) derived from an unsaturated carboxylic acid ester in the polymer (A) used in connection with one embodiment of the invention is preferably 65 mass % or more, and more preferably 75 mass % or more, based on the total mass of the polymer (A).

1.1.2. Fluorine-Containing Polymer

When the electrical storage device binder composition according to one embodiment of the invention is used to produce a positive electrode, it is preferable that the polymer (A) be a fluorine-containing polymer that includes a repeating unit (Ma) derived from a fluorine-containing ethylene-based monomer.

1.1.2.1. Repeating Unit (Ma) Derived from Fluorine-Containing Ethylene-Based Monomer The fluorine-containing polymer that may be used in connection with one embodiment of the invention includes the repeating unit (Ma) derived from a fluorine-containing ethylene-based monomer. Examples of the fluorine-containing ethylene-based monomer include a fluorine-containing olefin compound, a fluorine-containing (meth)acrylate, and the like. Examples of the fluorine atom-containing olefin compound include vinylidene fluoride, tetrafluoroethylene, hexafluoropropylene, ethylene chloride trifluoride, a perfluoroalkyl vinyl ether, and the like. Examples of the fluorine-containing (meth)acrylate include a compound represented by the following general formula (1), 3-[4-[1-trifluoromethyl-2,2-bis[bis(trifluoromethyl)fluoromethyl]ethynyloxy]benzoxy]-2-hydroxypropyl (meth)acrylate, and the like.

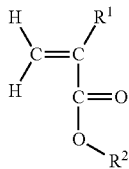

(1)

wherein $R^1$ is a hydrogen atom or a methyl group, and $R^2$ is a fluorine-containing hydrocarbon group having 1 to 18 carbon atoms.

Examples of the fluorine-containing hydrocarbon group having 1 to 18 carbon atoms represented by $R^2$ in the general formula (1) include a fluoroalkyl group having 1 to 12 carbon atoms, a fluoroaryl group having 6 to 16 carbon atoms, a fluoroaralkyl group having 7 to 18 carbon atoms, and the like. $R^2$ is preferably a fluoroalkyl group having 1 to 12 carbon atoms. Specific examples of a preferable fluorine-containing hydrocarbon group having 1 to 18 carbon atoms represented by $R^2$ in the general formula (1) include a 2,2,2-trifluoroethyl group, a 2,2,3,3,3-pentafluoropropyl group, a 1,1,1,3,3,3-hexafluoropropan-2-yl group, a beta-(perfluorooctyl)ethyl group, a 2,2,3,3-tetrafluoropropyl group, a 2,2,3,4,4,4-hexafluorobutyl group, a 1H,1H,5H-octafluoropentyl group, a 1H,1H,9H-perfluoro-1-nonyl group, a 1H,1H,11H-perfluoroundecyl group, a perfluorooctyl group, and the like.

The fluorine-containing ethylene-based monomer is preferably a fluorine-containing olefin compound, and more preferably at least one compound selected from the group consisting of vinylidene fluoride, tetrafluoroethylene, and hexafluoropropylene. These fluorine-containing ethylene-based monomers may be used either alone or in combination.

Excellent adhesion can be obtained while more effectively preventing deterioration in oxidation resistance when a polymer (Aa) that includes the repeating unit (Ma) derived from a fluorine-containing ethylene-based monomer, and a polymer (Ab) that includes the repeating unit (Mb) derived from an unsaturated carboxylic acid ester are used in combination as the fluorine-containing polymer, or used in the form of a polymer alloy.

The polymer (Aa) that includes the repeating unit (Ma) derived from a fluorine-containing ethylene-based monomer may include only the repeating unit (Ma) derived from a fluorine-containing ethylene-based monomer, or may include a repeating unit derived from an additional copolymerizable unsaturated monomer in addition to the repeating unit (Ma) derived from a fluorine-containing ethylene-based monomer. Examples of the repeating unit derived from the additional unsaturated monomer (copolymerizable unsaturated monomer) include the repeating unit (Mb) derived from an unsaturated carboxylic acid ester, a repeating unit (Mc) derived from an unsaturated carboxylic acid (described later), a repeating unit other than these repeating units, and the like. The repeating unit derived from the additional unsaturated monomer may be one or more repeating units selected from these repeating units.

The content of the repeating unit (Ma) derived from a fluorine-containing ethylene-based monomer in the polymer (Aa) is preferably 80 mass % or more, and more preferably 90 mass % or more, based on the total mass of the polymer (Aa). When the polymer (Aa) includes a repeating unit derived from vinylidene fluoride, the content of the repeating unit derived from vinylidene fluoride in the polymer (Aa) is preferably 50 to 99 mass %, and more preferably 80 to 98 mass %. When the polymer (Aa) includes a repeating unit derived from tetrafluoroethylene, the content of the repeating unit derived from tetrafluoroethylene in the polymer (Aa) is preferably 1 to 50 mass %, and more preferably 2 to 20 mass %. When the polymer (Aa) includes a repeating unit derived from hexafluoropropylene, the content of the repeating unit derived from hexafluoropropylene in the polymer (Aa) is preferably 1 to 50 mass %, and more preferably 2 to 20 mass %.

The polymer (Aa) can be easily produced by subjecting the fluorine-containing ethylene-based monomer and an optional additional unsaturated monomer to emulsion polymerization according to a known method.

1.1.2.2. Repeating Unit (Mb) Derived from Unsaturated Carboxylic Acid Ester

It is preferable that the fluorine-containing polymer used in connection with one embodiment of the invention include the repeating unit (Mb) derived from an unsaturated carboxylic acid ester. A polymer that includes the repeating unit (Mb) derived from an unsaturated carboxylic acid ester normally exhibits excellent adhesion, but may exhibit poor oxidation resistance. It was found that better oxidation resistance may be obtained while maintaining excellent adhesion by utilizing the repeating unit (Ma) derived from a fluorine-containing ethylene-based monomer and the repeating unit (Mb) derived from an unsaturated carboxylic acid ester in combination.

Examples of the unsaturated carboxylic acid ester include those mentioned above (see "1.1.1. Repeating unit (Mb) derived from unsaturated carboxylic acid ester").

The polymer (Ab) that includes the repeating unit (Mb) derived from an unsaturated carboxylic acid ester may be a polymer that includes only the repeating unit (Mb) derived from an unsaturated carboxylic acid ester, or may include a structural unit derived from an additional copolymerizable unsaturated monomer in addition to the repeating unit (Mb) derived from an unsaturated carboxylic acid ester.

The content of the repeating unit (Mb) derived from an unsaturated carboxylic acid ester in the fluorine-containing polymer used in connection with one embodiment of the invention is preferably 50 to 90 mass %, and more preferably 55 to 85 mass %, based on the total mass of the polymer (A).

1.1.2.3. Repeating Unit (Mc) Derived from Unsaturated Carboxylic Acid

When the fluorine-containing polymer includes the repeating unit (Mc) derived from an unsaturated carboxylic acid, an electrode slurry that is prepared using the electrical storage device binder composition according to one embodiment of the invention exhibits improved stability.

Specific examples of the unsaturated carboxylic acid include a monocarboxylic acid and a dicarboxylic acid such as acrylic acid, methacrylic acid, crotonic acid, maleic acid, fumaric acid, and itaconic acid. The unsaturated carboxylic acid may be one or more compounds selected from these compounds. The unsaturated carboxylic acid is preferably one or more compounds selected from acrylic acid, methacrylic acid, and itaconic acid.

The fluorine-containing polymer preferably includes the repeating unit (Mc) derived from an unsaturated carboxylic acid in a ratio of 15 parts by mass or less, and more preferably 0.3 to 10 parts by mass, based on the total amount (=100 parts by mass) of the repeating units.

1.1.2.4. Additional Repeating Unit

The fluorine-containing polymer may include an additional repeating unit other than the above repeating units. Examples of the additional repeating unit include repeating units derived from an alpha,beta-unsaturated nitrile compound, a conjugated diene compound, an aromatic vinyl compound, and an unsaturated monomer other than these compounds.

Specific examples of the alpha,beta-unsaturated nitrile compound include acrylonitrile, methacrylonitrile, alpha-chloro acrylonitrile, alpha-ethylacrylonitrile, vinylidene cyanide, and the like. The alpha,beta-unsaturated nitrile compound may be one or more compounds selected from these compounds. It is preferable that the alpha,beta-unsaturated nitrile compound be one or more compounds selected from acrylonitrile and methacrylonitrile. It is more preferable that the alpha,beta-unsaturated nitrile compound be acrylonitrile.

The fluorine-containing polymer may further include repeating units derived from an alkylamide of an ethylenically unsaturated carboxylic acid, such as (meth)acrylamide and N-methylolacrylamide; a carboxylic acid vinyl ester such as vinyl acetate and vinyl propionate; an ethylenically unsaturated dicarboxylic acid anhydride; a monoalkyl ester; a monoamide; an aminoalkylamide of an ethylenically unsaturated carboxylic acid, such as aminoethylacrylamide, dimethylaminomethylmethacrylamide, and methylaminopropylmethacrylamide; and the like. The fluorine-containing polymer may include one or more repeating units selected from repeating units derived from these compounds.

1.1.2.5. Production of Fluorine-Containing Polymer

The fluorine-containing polymer may be synthesized using an arbitrary method as long as the resulting fluorine-containing polymer has the above configuration. For example, the fluorine-containing polymer can be easily synthesized by utilizing a known emulsion polymerization process, or appropriately combining known emulsion polymerization processes. For example, the fluorine-containing polymer can be easily synthesized by utilizing the method disclosed in Japanese Patent No. 4957932 or the like.

1.1.3. Diene-Based Polymer

When the electrical storage device binder composition according to one embodiment of the invention is used to produce a negative electrode, it is preferable that the polymer (A) be a diene-based polymer. The diene-based polymer preferably includes a repeating unit (Md) derived from a conjugated diene compound, a repeating unit (Me) derived from an aromatic vinyl compound, a repeating unit (Mb) derived from an unsaturated carboxylic acid ester, and a repeating unit (Mc) derived from an unsaturated carboxylic acid.

1.1.3.1. Repeating Unit (Md) Derived from Conjugated Diene Compound

When the diene-based polymer includes the repeating unit (Md) derived from a conjugated diene compound, it is possible to easily prepare a negative electrode binder composition that exhibits excellent viscoelasticity and excellent strength. Specifically, a polymer that includes a repeating unit derived from a conjugated diene compound exhibits a high binding/bonding capability. Since the rubber elasticity due to the conjugated diene compound is provided to the polymer, the polymer can follow a change in volume (expansion and contraction) of an electrode, for example. It is considered that the binding/bonding capability is thus improved.

Examples of the conjugated diene compound include 1,3-butadiene, 2-methyl-1,3-butadiene, 2,3-dimethyl-1,3-butadiene, 2-chloro-1,3-butadiene, and the like. The conjugated diene compound may be one or more compounds selected from these compounds. 1,3-Butadiene is particularly preferable as the conjugated diene compound.

The diene-based polymer preferably includes the repeating unit (Md) derived from a conjugated diene compound in a ratio of 30 to 60 parts by mass, and more preferably 40 to 55 parts by mass, based on the total amount (=100 parts by mass) of the repeating units. When the diene-based polymer includes the repeating unit (Md) in an amount within the above range, the binding/bonding capability is further improved.

1.1.3.2. Repeating Unit (Me) Derived from Aromatic Vinyl Compound

When the diene-based polymer includes the repeating unit (Me) derived from an aromatic vinyl compound, the diene-based polymer exhibits excellent affinity to a conductivity-imparting agent that may be included in a negative electrode slurry.

Specific examples of the aromatic vinyl compound include styrene, alpha-methylstyrene, p-methylstyrene, vinyltoluene, chlorostyrene, divinylbenzene, and the like. The aromatic vinyl compound may be one or more compounds selected from these compounds. Styrene is particularly preferable as the aromatic vinyl compound.

The diene-based polymer preferably includes the repeating unit (Me) derived from an aromatic vinyl compound in a ratio of 10 to 40 parts by mass, and more preferably 15 to 30 parts by mass, based on the total amount (=100 parts by mass) of the repeating units. When the diene-based polymer includes the repeating unit (Me) in a ratio within the above range, the polymer (A) exhibits moderate adhesion to graphite that may be used as an electrode active material. Moreover, the resulting electrode active material layer exhibits excellent flexibility and excellent adhesion to a collector.

1.1.3.3. Repeating Unit (Mb) Derived from Unsaturated Carboxylic Acid Ester

When the diene-based polymer includes the repeating unit (Mb) derived from an unsaturated carboxylic acid ester, the diene-based polymer exhibits better affinity to an electrolyte solution. This makes it possible to reduce an increase in internal resistance that may occur when the hinder serves as an electrical resistance component in the electrical storage device. It is also possible to effectively prevent a decrease in binding/bonding capability (adhesion) due to excessive absorption of the electrolyte solution.

Specific examples of the unsaturated carboxylic acid ester include those mentioned above (see "1.1.1. Repeating unit (Mb) derived from unsaturated carboxylic acid ester").

The diene-based polymer preferably includes the repeating unit (Mb) derived from an unsaturated carboxylic acid ester in a ratio of 5 to 40 parts by mass, and more preferably 10 to 30 parts by mass, based on the total amount (=100 parts by mass) of the repeating units.

1.1.3.4. Repeating Unit (Mc) Derived from Unsaturated Carboxylic Acid

When the diene-based polymer includes the repeating unit (Mc) derived from an unsaturated carboxylic acid, an electrode slurry that is prepared using the electrical storage device binder composition according to one embodiment of the invention exhibits improved stability.

Specific examples of the unsaturated carboxylic acid include those mentioned above (see "1.1.2.3. Repeating unit (Mc) derived from unsaturated carboxylic acid").

The diene-based polymer preferably includes the repeating unit (Mc) derived from an unsaturated carboxylic acid in a ratio of 15 parts by mass or less, and more preferably 0.3 to 10 parts by mass, based on the total amount (=100 parts by mass) of the repeating units. When the diene-based polymer includes the repeating unit (Mc) in a ratio within the above range, the diene-based polymer exhibits excellent dispersion stability (i.e., aggregates are rarely formed) when preparing an electrode slurry. Moreover, an increase in the viscosity of the slurry with the passing of time can be reduced.

1.1.3.5. Additional Repeating Unit

The diene-based polymer may include an additional repeating unit other than the above repeating units. Examples of the additional repeating unit include a repeating unit derived from an alpha,beta-unsaturated nitrile compound.

Specific examples of the alpha,beta-unsaturated nitrile compound include those mentioned above (see "1.1.2.4. Additional repeating unit").

The diene-based polymer may further include an additional repeating unit other than the repeating unit derived from an alpha,beta-unsaturated nitrile compound, such as those mentioned above (see "1.1.2.4. Additional repeating unit").

1.1.3.6. Production of Diene-Based Polymer Particles

The diene-based polymer may be synthesized using an arbitrary method as long as the resulting diene-based polymer has the above configuration. For example, the diene-based polymer can be easily synthesized by utilizing a known emulsion polymerization process, or appropriately combining known emulsion polymerization processes. For example, the diene-based polymer can be easily synthesized by utilizing the method disclosed in Japanese Patent No. 4957932 or the like.

1.1.4. Properties of Polymer (A)

1.1.4.1. Tetrahydrofuran (THF)-Insoluble Content

The THF-insoluble content in the polymer (A) is preferably 80% or more, and more preferably 90% or more. It is considered that the THF-insoluble content is almost proportional to the content of components that are insoluble in an electrolyte solution used for an electrical storage device. When the THF-insoluble content in the polymer (A) is within the above range, it is considered that elution of the polymer (A) into an electrolyte solution can be suppressed even when an electrical storage device that is produced using the polymer (A) is subjected to repeated charge-discharge cycles for a long time.

1.1.4.2. Transition Temperature

When the polymer (A) is a fluorine-containing polymer, it is preferable that the polymer (A) have only one endothermic peak within a temperature range from −50° C. to +250° C. when subjected to differential scanning calorimetry (DSC) in accordance with JIS K 7121. It is more preferable that the polymer (A) have the only one endothermic peak within the temperature range from −30° C. to +30° C. When the polymer (Aa) is used alone, it is preferable that the polymer (Aa) have an endothermic peak (melting temperature) at −50° C. to +250° C.

When the polymer (A) is a diene-based polymer, it is preferable that the polymer (A) have only one endothermic peak within a temperature range from −50° C. to +5° C. when subjected to differential scanning calorimetry (DSC) in accordance with JIS K 7121.

1.1.4.3. Average Particle Size

When the polymer (A) included in the electrical storage device binder composition according to one embodiment of the invention is dispersed in the liquid medium (B) in the form of particles (i.e., when the electrical storage device binder composition is a latex), it is preferable that the polymer particles (A) have an average particle size of 50 to 400 nm, and more preferably 100 to 250 nm. When the polymer particles (A) have an average particle size within the above range, the polymer particles (A) are sufficiently adsorbed on the surface of an electrode active material, and can move along with the movement of the electrode active material. Therefore, it is possible to suppress a situation in which the polymer particles (A) or the electrode active material particles migrate alone, and reduce deterioration in electrical characteristics.

Note that the average particle size of the polymer particles (A) refers to a particle size (D50) at 50% in a cumulative particle size distribution measured using a particle size distribution analyzer that utilizes a light scattering method as a measurement principle. Examples of such a particle size distribution analyzer include Coulter LS230, Coulter LS100, and Coulter LS13320 (manufactured by Beckman Coulter, Inc.); FPAR-1000 (Otsuka Electronics Co., Ltd.); and the like. These particle size distribution analyzers can measure the particle size distribution of the primary particles of the polymer particles, and can also measure the particle size distribution of the secondary particles that are formed by the aggregation of the primary particles. Therefore, the particle size distribution measured using these particle size distribution analyzers can be used as an index of the dispersion state of the polymer particles included in the electrode slurry. Note that the average particle size of the polymer particles (A) may also be measured by centrifuging the electrode slurry to precipitate the electrode active material, and analyzing the supernatant liquid using the particle size distribution analyzer.

1.2. Liquid Medium (B)

The electrical storage device binder composition according to one embodiment of the invention includes the liquid medium (B). The liquid medium (B) is preferably an aqueous medium that includes water. The aqueous medium may include a non-aqueous medium other than water. Examples of the non-aqueous medium include an amide compound, a hydrocarbon, an alcohol, a ketone, an ester, an amine compound, a lactone, a sulfoxide, a sulfone compound, and the like. The non-aqueous medium may be one or more compounds selected from these compounds. When the liquid medium (B) includes water and a non-aqueous medium other than water, the content of water in the liquid medium (B) is preferably 90 mass % or more, and more preferably 98 mass % or more, based on the total amount (=100 mass %) of the liquid medium (B). When the aqueous medium is used as the liquid medium (B), the electrical storage device binder composition according to one embodiment of the invention has a low impact on the environment, and is highly safe for the operator.

The aqueous medium preferably includes a non-aqueous medium in a ratio of 10 parts by mass or less, and more preferably 5 parts by mass or less, based on the total amount (=100 parts by mass) of the aqueous medium. It is particularly preferable that the aqueous medium substantially does not include a non-aqueous medium. The expression "substantially does not include" used herein in connection with a non-aqueous medium means that a non-aqueous medium is not intentionally added as the liquid medium (B), and the liquid medium may include a non-aqueous medium that is inevitably mixed in the liquid medium (B) when preparing the electrical storage device binder composition.

1.3. Additive

The electrical storage device binder composition according to one embodiment of the invention may optionally include an additive in addition to the polymer (A) and the liquid medium (B). Examples of the additive include a preservative and a thickener. When the electrical storage device binder composition according to one embodiment of the invention includes a preservative, the electrical storage device binder composition exhibits further improved storage stability. When the electrical storage device binder composition according to one embodiment of the invention includes a thickener, it is possible to further improve the applicability of the electrical storage device binder composition, the charge-discharge characteristics of the resulting electrical storage device, and the like.

1.3.1. Preservative

The electrical storage device binder composition according to one embodiment of the invention may includes a preservative. When the electrical storage device binder composition includes an isothiazo line-based compound as the preservative, it is possible to reduce a situation in which bacteria, mold, and the like grow in the electrical storage device binder composition during storage to produce a foreign substance. Moreover, since deterioration in the binder is suppressed when charging and discharging the electrical storage device, deterioration in the charge-discharge characteristics of the electrical storage device can be reduced.

Specific examples of the preservative that may be included in the electrical storage device binder composition according to one embodiment of the invention include 1,2-benzisothiazolin-3-one, 2-methyl-4,5-trimethylene-4-isothiazolin-3-one, 2-methyl-4-isothiazolin-3-one, 5-chloro-2-methyl-4-isothiazolin-3-one, N-n-butyl-1,2-benzisothiazolin-3-one, 2-n-octyl-4-isothiazolin-3-one, 4,5-dichloro-2-n-octyl-4-isothiazolin-3-one, and the like. The preservative may be one compound, or two or more compounds, among these compounds. It is preferable that the preservative be at least one compound selected from the group consisting of 2-methyl-4-isothiazolin-3-one, 2-n-octyl-4-isothiazolin-3-one, 5-chloro-2-methyl-4-isothiazolin-3-one, and 1,2-benzisothiazolin-3-one.

1.3.2. Thickener

Examples of the thickener include a cellulose compound such as carboxymethyl cellulose, methyl cellulose, and hydroxypropyl cellulose; an ammonium salt or an alkali metal salt of the cellulose compound; a polycarboxylic acid such as poly(meth)acrylic acid and a modified poly(meth)acrylic acid; an alkali metal salt of the polycarboxylic acid; a polyvinyl alcohol-based (co)polymer such as polyvinyl alcohol, a modified polyvinyl alcohol, and an ethylene-vinyl alcohol copolymer; a water-soluble polymer such as a saponified product of a copolymer of an unsaturated carboxylic acid (e.g., (meth)acrylic acid, maleic acid, or fumaric acid) and a vinyl ester; and the like. An alkali metal salt of carboxymethyl cellulose, poly(meth)acrylic acid, and an alkali metal salt thereof are particularly preferable as the thickener.

Examples of commercially available products of these thickeners include CMC1120, CMC1150, CMC2200, CMC2280, and CMC2450 (manufactured by Daicel Corporation) (alkali metal salt of carboxymethyl cellulose); and the like.

When the electrical storage device binder composition according to one embodiment of the invention includes the thickener, the content of the thickener in the electrical storage device binder composition is preferably 5 mass % or less, and more preferably 0.1 to 3 mass %, based on the total solid content in the electrical storage device binder composition.

1.4. Particles Having a Particle Size of 10 to 50 Micrometers

The electrical storage device binder composition according to one embodiment of the invention includes the particles having a particle size of 10 to 50 micrometers.

The electrical storage device binder composition includes the particles having a particle size of 10 to 50 micrometers in a number of 1,000 to 100,000 per mL, preferably in a number of 1,000 to 50,000 per mL, and more preferably in a number of 1,000 to 10,000 per mL. When the electrical storage device binder composition includes the particles having a particle size of 10 to 50 micrometers in a number within the above range, an electrical storage device that includes an electrode produced by applying an electrode slurry prepared using the electrical storage device binder composition to a collector, exhibits excellent charge-discharge characteristics.

The mechanism by which the charge-discharge characteristics of the electrical storage device are improved is unclear at present, but it is conjectured that the charge-discharge characteristics of the electrical storage device are improved as described below. When the electrical storage device binder composition includes the particles having a particle size of 10 to 50 micrometers in a number of 1,000 to 100,000 per mL, an electrode active material layer that has been formed by applying an electrode slurry prepared using the electrical storage device binder composition to a collector, and drying the applied electrode slurry, also includes the particles having a particle size of 10 to 50 micrometers. It is conjectured that an electrode that includes such an electrode active material layer is characterized in that non-uniform voids are formed in the active material layer due to the particles having a particle size of 10 to 50 micrometers, and the absorption of an electrolyte solution is promoted. It is considered that the mobility of ions (e.g., lithium ions) that are involved in charge transfer is thus improved, and the charge-discharge characteristics of the electrical storage device are improved.

Known technology such as that disclosed in WO2010/032784 and WO2012/0066911 is influenced by a preconception that particles having a particle size of 10 to 50 micrometers should be thoroughly removed since such particles cause deterioration in charge-discharge characteristics, and induce a fatal defect (e.g., short circuit) (see above). However, it was found that such particles have an effect of improving the electrical storage characteristics instead of causing deterioration in electrical storage characteristics when the content of such particles is within a specific range.

Note that it is considered that the formation of voids is not effectively promoted, and the charge-discharge characteristics are not improved when the content (number) of the particles having a particle size of 10 to 50 micrometers is less than the above range. If the content (number) of the particles having a particle size of 10 to 50 micrometers exceeds the above range, it may be difficult to form a homogeneous electrode over a wide area since a short circuit may occur between the electrodes due to a large foreign substance. This makes it difficult to produce an electrical storage device that exhibits excellent charge-discharge characteristics.

The particles having a particle size of 10 to 50 micrometers included in the electrical storage device binder composition according to one embodiment of the invention are not particularly limited as long as the particles are formed of a material that does not store and release lithium ions, differing from an active material. It is preferable that the particles having a particle size of 10 to 50 micrometers be metal particles or oxide particles.

Examples of a material for forming the metal particles and the oxide particles include iron, titanium (titania), aluminum (alumina), zirconium (zirconia), magnesium (magnesia), oxides thereof, silica, stainless steel (e.g., SUS201, SUS202, SUS301, SUS302, SUS303, SUS304, SUS305, SUS316, SUS317, SUS403, SUS405, SUS420, SUS430, and SUS630), and the like. Among these, iron, stainless steel, titanium (titania), and aluminum (alumina) are preferable since the toughness of the active material layer is further improved. Rutile-type titanium oxide is preferable as the titania since the toughness of the active material layer is further improved.

The particle size of the particles included in the electrical storage device binder composition according to one embodiment of the invention is 10 to 50 micrometers, and preferably 10 to 20 micrometers. When the particle size of the particles is within the above range, it is possible to form a flat, smooth, and flexible active material layer that does not damage the separator situated adjacent to the active material film even when coming in contact with the separator. Therefore, the durability of the electrical storage device can be improved. Note that it is preferable that the particle size of the particles be smaller than the thickness of the active material layer. In this case, it is possible to prevent a situation in which the particles protrudes from the active material layer, reduce damage to the separator, and prevent a situation in which the particles pass through the separator.

Note that the particle size of the particles and the content of the particles in the electrical storage device binder composition refer to (are determined from) a particle size (D50) at 50% in a cumulative particle size distribution measured using a particle size distribution analyzer that utilizes a laser diffraction method as a measurement principle. Examples of such a laser diffraction particle size distribution analyzer include HORIBA LA-300 and HORIBA LA-920 (manufactured by Horiba, Ltd.); and the like. The particle size distribution analyzer that utilizes a laser diffraction method as a measurement principle can measure the particle size distribution of the primary particles, and can also measure the secondary particles that are formed by the aggregation of the primary particles. Therefore, the particle size measured using the particle size distribution analyzer that utilizes a laser diffraction method as a measurement principle can be used as an index of the dispersion state of the particles included in the electrical storage device composition. Note that the particle size of the particles may also be measured by centrifuging the electrical storage device composition to precipitate the particles, removing the supernatant liquid, and analyzing the particles using the above method.

2. ELECTRODE SLURRY

An electrode slurry may be prepared using the electrical storage device binder composition described above. The term "electrode slurry" used herein refers to a dispersion that is applied to the surface of a collector, and dried to form an electrode active material layer on the surface of the collector. An electrode slurry according to one embodiment of the invention includes the electrical storage device binder composition described above, and an electrode active material. Each component included in the electrode slurry according to one embodiment of the invention is described in detail below. Note that the electrical storage device binder composition is the same as described above, and description thereof is omitted.

2.1. Electrode Active Material

A material for forming the electrode active material included in the electrode slurry according to one embodiment of the invention is not particularly limited. An arbitrary material may be appropriately selected taking account of the type of the desired electrical storage device.

For example, when producing a positive electrode of a lithium-ion secondary battery, it is preferable to use a lithium-containing oxide. The term "oxide" used herein refers to a compound or a salt that includes oxygen, and an element that has an electronegativity lower than that of oxygen. The term "oxide" used herein includes a metal oxide, a metal phosphate, a metal nitrate, a halogen oxo acid salt of a metal, a metal sulfonate, and the like.

Examples of the lithium-containing oxide include a complex metal oxide represented by the following general formula (3a) or (3b), and a lithium-containing oxide that is represented by the following general formula (4), and has an olivine crystal structure. It is preferable that the lithium-containing oxide be one or more compounds selected from the group consisting of these compounds.

$$Li_{1+x}M^1_yM^2_zO_2 \quad (3a)$$

$$Li_{1+x}M^1_yM^2_zO_4 \quad (3b)$$

wherein $M^1$ is at least one metal atom selected from the group consisting of Co, Ni, and Mn, $M^2$ is at least one metal atom selected from the group consisting of Al and Sn, O is an oxygen atom, x is a number within a range of $0.10 \geq x \geq 0$, y is a number within a range of $4.00 \geq y \geq 0.85$, and z is a number within a range of $2.00 \geq z \geq 0$.

$$Li_{1-x}M^3_x(XO_4) \quad (4)$$

wherein $M^3$ is an ion of at least one metal selected from the group consisting of Mg, Ti, V, Nb, Ta, Cr, Mn, Fe, Co, Ni, Cu, Zn, Al, Ga, Ge, and Sn, X is at least one atom selected from the group consisting of Si, S, P, and V, and x is a number within a range of $0<x<1$.

Note that x in the general formula (4) is selected corresponding to the valence of $M^3$ and X so that the valence of the lithium-containing oxide represented by the general formula (4) is 0.

Examples of the complex metal oxide represented by the general formula (3a) or (3b) include $LiCoO_2$, $LiNiO_2$, $LiNi_yCo_{1-y}O_2$ (y=0.01 to 0.99), $LiMnO_2$, $LiMn_2O_4$, $LiCo_x Mn_yNi_zO_2$ (x+y+z=1), and the like. The complex metal oxide may be one or more compounds selected from these compounds. A high-voltage electrical storage device having high energy density can be obtained by utilizing $LiCoO_2$, $LiMn_2O_4$, $LiNiO_2$, or $LiNi_{0.33}Mn_{0.33}Co_{0.33}O_2$ that achieve high electrode potential and high efficiency. It is particularly preferable to use $Li_{1+x}M^1_yM^2_zO_2$ due to a high Li diffusion rate in a solid and a high charge-discharge rate.

The lithium-containing oxide that is represented by the general formula (4) and has an olivine crystal structure differs in electrode potential depending on the type of metal element represented by $M^3$. Therefore, the battery voltage can be arbitrarily set by appropriately selecting the metal element M. Typical examples of the lithium-containing oxide having an olivine crystal structure include $LiFePO_4$, $LiCoPO_4$, $Li_{0.90}Ti_{0.05}Nb_{0.05}Fe_{0.30}Co_{0.30}Mn_{0.30}PO_4$, and the like. Among these, $LiFePO_4$ is preferable since an iron compound used as the raw material is easily available and is inexpensive. A compound obtained by substituting the Fe ion included in the above compound with a Co ion, an Ni ion, or an Mn ion, has the same crystal structure as that of the above compound, and achieves the same effect when used as the electrode active material.

When producing a negative electrode of a lithium-ion secondary battery, carbon may be used as the electrode active material (negative electrode active material), for example. Specific examples of the carbon include a carbon material that is obtained by calcining an organic polymer compound (e.g., phenol resin, polyacrylonitrile, or cellulose); a carbon material that is obtained by calcining coke or pitch; artificial graphite; natural graphite; and the like.

When producing an electrode of an electrical double-layer capacitor, activated carbon, activated carbon fibers, silica, alumina, or the like may be used as the electrode active material. When producing an electrode of a lithium-ion capacitor, a carbon material (e.g., graphite, non-graphitizable carbon, hard carbon, or coke), a polyacenic semiconductor (PAS), or the like may be used as the electrode active material.

It is preferable that the electrode active material used to produce a positive electrode have an average particle size (Db) of 0.4 to 10 micrometers, and more preferably 0.5 to 7 micrometers. It is preferable that the electrode active material used to produce a negative electrode have an average particle size (Db) of 3 to 30 micrometers, and more preferably 5 to 25 micrometers. When the electrode active material has an average particle size (Db) within the above range, the diffusion length of lithium in the electrode active material decreases. Therefore, it is possible to reduce the resistance that occurs due to insertion and extraction of lithium during charge and discharge, and further improve the charge-discharge characteristics. When the electrode slurry includes a conductivity-imparting agent (described later), and the electrode active material has an average particle size (Db) within the above range, it is possible to provide a sufficient area of contact between the electrode active material and the conductivity-imparting agent. Therefore, the electron conductivity of the electrode is improved, and the electrode resistance is further reduced.

Note that the average particle size (Db) of the electrode active material refers to a particle size (D50) at 50% in a cumulative particle size distribution measured using a particle size distribution analyzer that utilizes a laser diffraction method as a measurement principle. Examples of such a laser diffraction particle size distribution analyzer include HORIBA LA-300 and HORIBA LA-920 (manufactured by Horiba, Ltd.); and the like. The laser diffraction particle size distribution analyzer can measure the particle size distribution of the primary particles of the electrode active material, and can also measure the secondary particles that are formed by the aggregation of the primary particles. Therefore, the average particle size (Db) measured using the laser diffraction particle size distribution analyzer can be used as an index of the dispersion state of the electrode active material included in the electrode slurry. The average particle size (Db) of the electrode active material may also be measured by centrifuging the electrode slurry to precipitate the electrode active material, removing the supernatant liquid, and analyzing the electrode active material using the method described above.

2.2. Additional Component

The electrode slurry may optionally include an additional component other than the above components. Examples of the additional component include a conductivity-imparting agent, water, a non-aqueous medium, a thickener, and the like.

2.2.1. Conductivity-Imparting Agent

Specific examples of the conductivity-imparting agent used when producing a lithium-ion secondary battery include carbon and the like. Specific examples of the conductivity-imparting agent used when producing a nickel-hydrogen secondary battery include cobalt oxide (used for the positive electrode), a nickel powder (used for the negative electrode), cobalt oxide (used for the negative electrode), titanium oxide (used for the negative electrode), carbon (used for the negative electrode), and the like. Examples of the carbon include graphite, activated carbon, acetylene black, furnace black, graphite, carbon fibers, fullerenes, and the like. It is preferable to use acetylene black or furnace black. The conductivity-imparting agent is preferably used in a ratio of 20 parts by mass or less, more preferably 1 to 15 parts by mass, and particularly preferably 2 to 10 parts by mass, based on 100 parts by mass of the electrode active material.

2.2.2. Non-Aqueous Medium

The electrode slurry may include a non-aqueous medium having a normal boiling point of 80 to 350° C. so that the applicability of the electrode slurry is improved. Specific examples of the non-aqueous medium include an amide compound such as N-methylpyrrolidone, dimethylformamide, and N,N-dimethylacetamide; a hydrocarbon such as toluene, xylene, n-dodecane, and tetralin; an alcohol such as 2-ethyl-1-hexanol, 1-nonanol, and lauryl alcohol; a ketone such as methyl ethyl ketone, cyclohexanone, phorone, acetophenone, and isophorone; an ester such as benzyl acetate, isopentyl butyrate, methyl lactate, ethyl lactate, and butyl lactate; an amine compound such as o-toluidine, m-toluidine, and p-toluidine; a lactone such as gamma-butyrolactone and delta-butyrolactone; a sulfoxide/sulfone compound such as dimethyl sulfoxide and sulfolane; and the like. The non-aqueous medium may be one or more compounds selected from these compounds. It is preferable to use N-methylpyrrolidone as the non-aqueous medium from the viewpoint of the stability of the polymer particles, workability when applying the electrode slurry, and the like.

2.2.3. Thickener

The electrode slurry may include a thickener so that the applicability of the electrode slurry is improved. Specific examples of the thickener include the compounds mentioned above (see "1.3.2. Thickener").

When the electrode slurry includes the thickener, it is preferable that the electrode slurry include the thickener in a ratio of 20 mass % or less, more preferably 0.1 to 15 mass %, and particularly preferably 0.5 to 10 mass %, based on the total solid content in the electrode slurry.

2.3. Method for Preparing Electrode Slurry

The electrode slurry according to one embodiment of the invention may be prepared by mixing the electrical storage device binder composition, the electrode active material, and an optional additive. The electrical storage device binder composition, the electrode active material, and an optional additive may be mixed by stirring the electrical storage device binder composition, the electrode active material, and an optional additive using a known method (e.g., a method that utilizes a stirrer, a deaerator, a bead mill, a high-pressure homogenizer, or the like).

It is preferable that at least part of the electrode slurry preparation process (i.e., the component mixing operation) be performed under reduced pressure. This makes it possible to prevent formation of bubbles in the resulting electrode layer. The degree of decompression (absolute pressure) is preferably about $5.0 \times 10^3$ Pa to about $5.0 \times 10^5$ Pa.

When mixing (stirring) the electrical storage device binder composition, the electrode active material, and an optional additive in order to prepare the electrode slurry, it is necessary to select a mixer that can stir the electrical storage device binder composition, the electrode active material, and an optional additive so that aggregates of the electrode active material do not remain in the resulting slurry, and select necessary and sufficient dispersion conditions. The degree of dispersion can be measured using a grind gauge. It is preferable to effect mixing and dispersion so that the resulting slurry does not include aggregates having a size larger than 100 micrometers. Examples of a mixer that satisfies the above conditions include a ball mill, a sand mill, a pigment disperser, a grinder, an ultrasonic disperser, a homogenizer, a planetary mixer, a Hobart mixer, and the like.

The solid content (i.e., the ratio of the total mass of the components other than a solvent to the total mass of the slurry) in the electrode slurry according to one embodiment of the invention is preferably 20 to 80 mass %, and more preferably 30 to 75 mass %.

3. ELECTRODE

An electrode according to one embodiment of the invention includes a collector, and a layer formed on the surface of the collector, the layer having been formed by applying the electrode slurry to the surface of the collector, and drying the applied electrode slurry. The electrode may be produced by applying the electrode slurry to the surface of an arbitrary collector (e.g., metal foil) to form a film, and drying the film to form an electrode active material layer. The electrode thus produced has a structure in which the electrode active material layer that includes the polymer (A), the particles having a particle size of 10 to 50 micrometers, the electrode active material, and an optional component, is bonded to the collector. The electrode is characterized in that the electrode active material layer exhibits excellent adhesion to the collector, and has excellent charge-discharge rate characteristics (i.e., electrical characteristics). Therefore, the electrode is suitable as an electrode of an electrical storage device.

A method for producing an electrical storage device electrode according to one embodiment of the invention includes: (1) providing an electrode slurry that includes a polymer (A), a liquid medium (B), particles having a particle size of 10 to 50 micrometers, and an electrode active material, the electrode slurry including the particles having a particle size of 10 to 50 micrometers in a number of 1,000 to 100,000 per mL; (2) applying the electrode slurry to the surface of a collector; and (3) drying the electrode slurry that has been applied to the surface of the collector.

The collector is not particularly limited as long as the collector is formed of a conductive material. A collector made of a metal (e.g., iron, copper, aluminum, nickel, or stainless steel) may be used for a lithium-ion secondary battery. The advantageous effects of the electrode slurry that is prepared using the electrode binder composition are most effectively achieved when aluminum is used for the positive electrode, and copper is used for the negative electrode. A perforated metal, an expanded metal, a wire gauze, a foam metal, sintered mesh-like metal fibers, a metal-plated resin sheet, or the like is used as a collector for a nickel-hydrogen secondary battery. The shape and the thickness of the collector are not particularly limited. It is preferable to use a sheet-like collector having a thickness of about 0.001 mm to about 0.5 mm.

The electrode slurry may be applied to the collector using an arbitrary method. For example, the electrode slurry may be applied to the collector using a doctor blade method, a dipping method, a reverse roll method, a direct roll method, a gravure method, an extrusion method, an immersion method, a brush coating method, or the like. The electrode slurry may be applied to the collector in an arbitrary amount. It is preferable to apply the electrode slurry to the collector in such an amount that the electrode active material layer formed by removing the liquid medium (including water and an optional non-aqueous medium) has a thickness of 0.005 to 5 mm, and more preferably 0.01 to 2 mm. When the thickness of the electrode active material layer is within the above range, the electrode active material layer can effectively absorb the electrolyte solution. As a result, metal ions are easily transferred between the electrode active material included in the electrode active material layer and the electrolyte solution during charge and discharge, and the electrode resistance can be further reduced. Moreover, the electrode active material layer is not removed from the collector (i.e., the electrode active material layer exhibits excellent adhesion to the collector) even when the electrode is folded or wound, and an electrical storage device electrode that exhibits flexibility can be obtained.

The film formed by applying the electrode slurry may be dried (i.e., water and an optional non-aqueous medium may be removed) using an arbitrary method. For example, the film may be dried using warm air, hot air, or low-humidity air, or may be dried under vacuum, or may be dried by applying (far) infrared light, an electron beam, or the like. The drying speed may be appropriately set so that the liquid medium can be removed as quickly as possible while preventing a situation in which cracks are formed in the electrode active material layer due to stress concentration, or the electrode active material layer is removed from the collector.

It is preferable to increase the density of the electrode active material layer by pressing the dried collector so that the porosity falls within the range described below. The collector may be pressed using a die press, a roll press, or the like. The press conditions are appropriately set taking account of the type of press, and the desired porosity and density of the electrode active material layer. It is considered that a person having ordinary skill in the art can easily set the press conditions by performing some preliminary experiments. For example, when using a roll press, the linear pressure of the roll press may be set to 0.1 to 10 t/cm, and preferably 0.5 to 5 t/cm, the roll temperature may be set to 20 to 100° C., and the feed speed (roll rotational speed) of the dried collector may be set to 1 to 80 m/min, and preferably 5 to 50 m/min.

The density of the electrode active material layer after pressing is preferably 1.5 to 5.0 g/cm$^3$, more preferably 1.5 to 4.0 g/cm$^3$, and particularly preferably 1.6 to 3.8 g/cm$^3$. When the electrode active material is the complex metal oxide represented by the general formula (3a) or (3b), the density of the electrode active material layer is preferably 2.0 to 4.0 g/cm$^3$, and more preferably 3.0 to 3.5 g/cm$^3$. When the electrode active material is the compound that is represented by the general formula (4) and has an olivine crystal structure, the density of the electrode active material layer is preferably 1.5 to 2.5 g/cm$^3$, more preferably 1.6 to 2.4 g/cm$^3$, still more preferably 1.7 to 2.2 g/cm$^3$, and particularly preferably 1.8 to 2.1 g/cm$^3$. When the density of the electrode active material layer is within the above range, the electrode active material layer exhibits excellent adhesion to the collector, and an electrode that exhibits excellent fall-off resistance and excellent electrical characteristics can be obtained.

The porosity of the electrode active material layer after pressing is preferably 10 to 50%, more preferably 15 to 45%, and particularly preferably 20 to 40%. When the porosity of the electrode active material layer is within the above range, the electrode active material layer exhibits excellent adhesion to the collector, and an electrode that exhibits excellent fall-off resistance and excellent electrical characteristics can be obtained. Moreover, the electrode active material layer can sufficiently absorb the electrolyte solution, and the surface of the electrode active material sufficiently comes in contact with the electrolyte solution. As a result, lithium ions are easily transferred between the electrode active material and the electrolyte solution, and excellent charge-discharge characteristics can be achieved.

4. ELECTRICAL STORAGE DEVICE

An electrical storage device according to one embodiment of the invention includes the electrode described above, and an electrolyte solution. The electrical storage device according to one embodiment of the invention may be produced in accordance with an ordinary method using parts such as a separator. More specifically, the electrical storage device may be produced by stacking a negative electrode and a positive electrode on either side of a separator to form a laminate, winding or folding the laminate in the shape of a battery, placing the laminate in a battery casing, injecting the electrolyte solution into the battery casing, and sealing the battery casing, for example. The battery may have an arbitrary shape (e.g., coin-like shape, button-like shape, sheet-like shape, cylindrical shape, square shape, or flat shape).

The electrolyte solution may be in the form of a liquid or gel. The electrolyte solution may be selected from known electrolyte solutions used for an electrical storage device taking account of the type of electrode active material so that the function of the battery is effectively achieved. The electrolyte solution may be a solution prepared by dissolving an electrolyte in an appropriate solvent.

An arbitrary known lithium salt may be used as the electrolyte used to produce a lithium-ion secondary battery. Specific examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiCF_3SO_3$, $LiCH_3SO_3$, $LiC_4F_9SO_3$, $Li(CF_3SO_2)_2N$, a lithium lower aliphatic carboxylate, and the like.

The solvent used to dissolve the electrolyte is not particularly limited. Specific examples of the solvent include a carbonate compound such as propylene carbonate, ethylene carbonate, butylene carbonate, dimethyl carbonate, methylethyl carbonate, and diethyl carbonate; a lactone compound such as gamma-butyrolactone; an ether compound such as trimethoxymethane, 1,2-dimethoxyethane, diethyl ether, 2-ethoxyethane, tetrahydrofuran, and 2-methyltetrahydrofuran; a sulfoxide compound such as dimethyl sulfoxide; and the like. The solvent may be one or more compounds selected from these compounds. The concentration of the electrolyte in the electrolyte solution is preferably 0.5 to 3.0 mol/L, and more preferably 0.7 to 2.0 mol/L.

5. EXAMPLES

The invention is further described below by way of examples. Note that the invention is not limited to the following examples. The units "parts" and "%" used in connection with the examples and comparative examples respectively refer to "parts by mass" and "mass %" unless otherwise indicated.

5.1. Synthesis Example 1

5.1.1. Production of polymer (A)

An autoclave (internal volume: about 6 L) equipped with an electromagnetic stirrer in which the internal atmosphere had been sufficiently replaced by nitrogen, was charged with 2.5 L of deoxidized purified water and 25 g of ammonium perfluorodecanoate (emulsifier), and the mixture was heated to 60° C. with stirring (350 rpm). The autoclave was then charged with a mixed gas including vinylidene fluoride (VDF) (70%) and hexafluoropropylene (HFP) (30%) (monomers) until the internal pressure reached 20 kg/cm$^2$. 25 g of a CFC-113 solution including 20% of diisopropyl peroxydicarbonate (initiator) was injected into the autoclave using nitrogen gas to initiate polymerization. The internal pressure was maintained at 20 kg/cm$^2$ during polymerization by successively injecting a mixed gas including VDF (60.2%) and HFP (39.8%). Since the polymerization rate decreased along with the progress of polymerization, 25 g of a CFC-113 solution including 20% of diisopropyl peroxydicarbonate was injected again using nitrogen gas when 3 hours had elapsed, and the polymerization reaction was effected for a further 3 hours. The reaction mixture was then cooled without stirring. Unreacted monomers were removed to terminate the reaction to obtain an aqueous dispersion including fine particles of a polymer (Aa) in a ratio of 40%. The mass ratio of VDF to HFP in the polymer (Aa) determined by $^{19}$F-NMR analysis was 21/4.

A 7 L separable flask in which the internal atmosphere had been sufficiently replaced by nitrogen, was charged with 1,600 g (25 parts by mass based on the polymer (Aa)) of the aqueous dispersion including the fine particles of the polymer (Aa) (obtained as described above), 0.5 parts by mass of an emulsifier ("Adeka Reasoap SR1025 manufactured by Adeka Corporation), 30 parts by mass of methyl methacrylate (MMA), 40 parts by mass of 2-ethylhexyl acrylate (EHA), 5 parts by mass of methacrylic acid (MAA), and 130 parts by mass of water. The mixture was stirred at 70° C. for 3 hours so that the monomers were absorbed in the polymer (Aa). After the addition of 20 mL of a tetrahydrofuran solution including 0.5 parts by mass of azobisisobutyronitrile (oil-soluble initiator), the mixture was reacted at 75° C. for 3 hours, and then reacted at 85° C. for 2 hours. After cooling the mixture to terminate the reaction, the pH of the mixture was adjusted to 7 using a 2.5 N sodium hydroxide aqueous solution to obtain an aqueous dispersion including polymer particles (A) in a ratio of 40%.

About 10 g of the aqueous dispersion was weighed on a Teflon (registered trademark) Petri dish (diameter: 8 cm), and dried at 120° C. for 1 hour to form a film. 1 g of the resulting film (polymer) was immersed in 400 mL of tetrahydrofuran (THF), followed by shaking at 50° C. for 3 hours. After filtering the TI-IF phase through a wire gauze (300 mesh), THF included in the filtrate was evaporated off, and the weight (Y (g)) of the residue was measured. The THF-insoluble content in the polymer particles calculated using the following expression (9) was 85%.

THF-insoluble content (%)=((1−Y)/1)×100    (9)

The fine particles were subjected to differential scanning calorimetry using a differential scanning calorimeter (DSC). The fine particles had only one glass transition temperature (Tg) at −5° C. Since the polymer particles (A) had only one glass transition temperature (Tg) although two types of polymers were used, it is considered that the polymer (A) was a polymer alloy.

5.1.2. Preparation of Polymer Composition 31 g of an aqueous suspension including 2-methyl-4-isothiazolin-3-one (1%) was added to 1,000 g of the aqueous dispersion including the polymer particles (A), and the mixture was stirred at 300 rpm to prepare a polymer composition F1. In the synthesis examples in which a water-insoluble preservative was used, a dispersion prepared by dispersing the preservative in an aqueous solution using ultrasonic waves was added when preparing the polymer composition.

The particle size distribution of the polymer composition was measured using a particle size distribution analyzer that utilizes a dynamic light scattering method as a measurement principle ("FPAR-1000" manufactured by Otsuka Electronics Co., Ltd.), and the modal particle size was determined from the particle size distribution. The number average particle size thus determined was 330 nm.

5.2. Synthesis Examples 2 to 7 and Synthesis Example 11

An aqueous dispersion including polymer particles (A) having the composition listed in Table 1 was prepared in the same manner as in Synthesis Example 1 (see "5.1.1. Production of polymer (A)"), except that the monomer composition and the amount of the emulsifier were appropriately changed. Water was removed or added under reduced pressure corresponding to the solid content in the aqueous dispersion to obtain an aqueous dispersion having a solid content of 40%. When the fine particles obtained in Synthesis Examples 2 to 7 and Synthesis Example 11 were subjected to differential scanning calorimetry using a differential scanning calorimeter (DSC), only one glass transition temperature (Tg) was observed at the temperature listed in Table 1. Since the polymer (A) had only one glass transition temperature (Tg) although two types of polymers were used, it is considered that the polymer (A) was a polymer alloy.

Polymer compositions F2 to F7 and F11 were prepared in the same manner as in Synthesis Example 1 (see "5.1.2. Preparation of polymer composition"), except that the type and the amount of polymer (A) and the type and the amount of preservative were changed as listed in Table 1.

5.3. Synthesis Example 8

A 7 L separable flask was charged with 150 parts by mass of water and 0.2 parts by mass of sodium dodecylbenzenesulfonate, and the internal atmosphere in the separable flask was sufficiently replaced by nitrogen. Another vessel was charged with 60 parts by mass of water, 0.8 parts by mass (on a solid basis) of an ether sulfate emulsifier ("Adeka Reasoap SR1025" manufactured by Adeka Corporation) (emulsifier), 20 parts by mass of 2,2,2-trifluoroethyl methacrylate (TFEMA) (monomer), 10 parts by mass of acrylonitrile (AN) (monomer), 25 parts by mass of methyl methacrylate (MMA) (monomer), 40 parts by mass of 2-ethylhexyl acrylate (EHA) (monomer), and 5 parts by mass of acrylic acid (AA) (monomer). The mixture was sufficiently stirred to obtain a monomer emulsion including a monomer mixture. The temperature inside the separable flask was then increased. When the temperature inside the separable flask had reached 60° C., 0.5 parts by mass of ammonium persulfate (initiator) was added to the separable flask. When the temperature inside the separable flask had reached 70° C., the monomer emulsion prepared as described above was slowly added to the separable flask over 3 hours while maintaining the temperature inside the separable flask at 70° C. After increasing the temperature inside the separable flask to 85° C., a polymerization reaction was effected at 85° C. for 3 hours. When 3 hours had elapsed, the separable flask was cooled to terminate the reaction, and the pH of the mixture was adjusted to 7.6 by adding aqueous ammonia to obtain an aqueous dispersion including polymer particles (A) in a ratio of 30%.

A polymer composition F8 was prepared in the same manner as in Synthesis Example 1, except that the resulting aqueous dispersion was used.

5.4. Synthesis Examples 9 and 10

An aqueous dispersion including the polymer (A) listed in Table 1 was obtained in the same manner as in Synthesis Example 8, except that the types and the amounts (parts) of monomers were changed as listed in Table 1. Polymer compositions F9 and F10 were prepared in the same manner as in Synthesis Example 1, except that the resulting aqueous dispersion was used.

TABLE 1

|  |  | Synthesis Example 1 | Synthesis Example 2 | Synthesis Example 3 | Synthesis Example 4 | Synthesis Example 5 | Synthesis Example 6 |
|---|---|---|---|---|---|---|---|
|  | Polymer composition | F1 | F2 | F3 | F4 | F5 | F6 |
| Composition of | VDF (parts by mass) | 21 | 20 | 24 | 21 | 21 | 20 |
| polymer particles (A) | HFP (parts by mass) | 4 | 5 | 1 | 4 | 4 | 5 |
|  | TFEMA (parts by mass) | — | — | — | — | — | — |
|  | TFEA (parts by mass) | — | — | — | — | — | — |
|  | HFIPA (parts by mass) | — | — | — | — | — | — |
|  | MMA (parts by mass) | 30 | 30 | 30 | 30 | 30 | 30 |
|  | EHA (parts by mass) | 40 | 40 | 40 | 40 | 40 | 40 |
|  | MAA (parts by mass) | 5 | — | 5 | 5 | 5 | — |

TABLE 1-continued

|  |  |  |  |  |  |  |  |
|---|---|---|---|---|---|---|---|
|  | AA (parts by mass) | — | 5 | — | — | — | 5 |
|  | DVB (parts by mass) | — | — | — | — | — | — |
|  | TMPTMA (parts by mass) | — | — | — | — | — | — |
|  | AN (parts by mass) | — | — | — | — | — | — |
| Preservative | 2-Methyl-4-isothiazolin-3-one (ppm) | 300 | — | — | — | — | 30 |
|  | 2-n-Octyl-4-isothiazolin-3-one (ppm) | — | 600 | — | 1,400 | — | — |
|  | 5-Chloro-2-methyl-4-isothiazolin-3-one (ppm) | — | — | 800 | — | — | — |
|  | 1,2-Benzisothiazolin-3-one (ppm) | — | — | — | — | 700 | — |
|  | Liquid medium (B) | Water | Water | Water | Water | Water | Water |
| Properties of polymer particles | Number average particle size (nm) | 330 | 210 | 330 | 330 | 330 | 330 |
|  | THF-insoluble content (%) | 85 | 95 | 95 | 85 | 85 | 85 |
|  | Tg (° C.) | −5 | −5 | 1 | −5 | −5 | −5 |

|  |  | Synthesis Example 7 | Synthesis Example 8 | Synthesis Example 9 | Synthesis Example 10 | Synthesis Example 11 |
|---|---|---|---|---|---|---|
|  | Polymer composition | F7 | F8 | F9 | F10 | F11 |
| Composition of polymer particles (A) | VDF (parts by mass) | 20 | — | — | — | 21 |
|  | HFP (parts by mass) | 5 | — | — | — | 4 |
|  | TFEMA (parts by mass) | — | 20 | — | — | — |
|  | TFEA (parts by mass) | — | — | 20 | — | — |
|  | HFIPA (parts by mass) | — | — | — | 20 | — |
|  | MMA (parts by mass) | 30 | 25 | 9 | 30 | 30 |
|  | EHA (parts by mass) | 40 | 40 | 40 | 40 | 40 |
|  | MAA (parts by mass) | — | — | — | — | 5 |
|  | AA (parts by mass) | 5 | 5 | 5 | 5 | — |
|  | DVB (parts by mass) | — | — | 0.5 | — | — |
|  | TMPTMA (parts by mass) | — | — | 0.5 | — | — |
|  | AN (parts by mass) | — | 10 | 25 | 5 | — |
| Preservative | 2-Methyl-4-isothiazolin-3-one (ppm) | 2,000 | — | — | 1,200 | — |
|  | 2-n-Octyl-4-isothiazolin-3-one (ppm) | — | — | — | — | — |
|  | 5-Chloro-2-methyl-4-isothiazolin-3-one (ppm) | — | 1,100 | — | — | — |
|  | 1,2-Benzisothiazolin-3-one (ppm) | — | — | 60 | — | — |
|  | Liquid medium (B) | Water | Water | Water | Water | Water |
| Properties of polymer particles | Number average particle size (nm) | 330 | 110 | 250 | 300 | 330 |
|  | THF-insoluble content (%) | 85 | 78 | 75 | 70 | 85 |
|  | Tg (° C.) | −5 | 8 | 2 | −9 | −5 |

The details of the abbreviation for each component listed in Table 1 are as follows.
VDF: vinylidene fluoride
HFP: hexafluoropropylene
TFEMA: 2,2,2-trifluoroethyl methacrylate
TFEA: 2,2,2-trifluoroethyl acrylate
HFIPA: 1,1,1,3,3,3-hexafluoroisopropyl acrylate
MMA: methyl methacrylate
EHA: 2-ethylhexyl acrylate
MAA: methacrylic acid
AA: acrylic acid
DVB: divinylbenzene
TMPTMA: trimethylolpropane trimethacrylate
AN: acrylonitrile

5.5. Synthesis Example 12

A temperature-adjustable autoclave equipped with a stirrer was charged with 200 parts by mass of water, 0.9 parts by mass of sodium dodecylbenzenesulfonate, 1.0 parts by mass of potassium persulfate, 0.5 parts by mass of sodium hydrogen sulfite, 0.2 parts by mass of an alpha-methylstyrene dimer, 0.2 parts by mass of dodecylmercaptan, and the first-step polymerization components listed in Table 3. The mixture was heated to 70° C., and subjected to a polymerization reaction for 2 hours. After confirming that the polymerization conversion rate was 80% or more, the second-step polymerization components listed in Table 3 were added to the mixture over 6 hours while maintaining the reaction temperature at 70° C. When 3 hours had elapsed after the start of addition of the second-step polymerization components, 1.0 parts by mass of an alpha-methylstyrene dimer and 0.3 parts by mass of dodecylmercaptan were added to the mixture. After the addition of the second-step polymerization components, the mixture was heated to 80° C., and reacted for 2 hours. After completion of the polymerization reaction, the pH of the resulting latex was adjusted to 7.5, followed by the addition of 5 parts by mass (on a solid basis) of potassium tripolyphosphate. The residual monomers were removed by steam distillation, and the residue was concentrated under reduced pressure until the solid content reached 50% to obtain an aqueous dispersion including a polymer (A) in a ratio of 50%.

A polymer composition Si was prepared in the same manner as in Synthesis Example 1, except that the resulting aqueous dispersion was used.

5.6. Synthesis Examples 13 to 24

An aqueous dispersion including the polymer (A) listed in Table 2 was obtained in the same manner as in Synthesis Example 12, except that the types and the amounts (parts) of monomers were changed as listed in Table 2, and the ratio of the first-step polymerization components and the second-step polymerization components used to produce the polymer (A) was changed as listed in Table 3. Polymer compositions S2 to S13 were prepared in the same manner as in Synthesis Example 1, except that the resulting aqueous dispersion was used.

TABLE 2

|  |  | Synthesis Example 12 | Synthesis Example 13 | Synthesis Example 14 | Synthesis Example 15 | Synthesis Example 16 | Synthesis Example 17 | Synthesis Example 18 |
| --- | --- | --- | --- | --- | --- | --- | --- | --- |
|  | Polymer composition | S1 | S2 | S3 | S4 | S5 | S6 | S7 |
| Composition of polymer particles (A) | MMA (parts by mass) | 12 | 7 | 10 | — | 11 | 12 | 12 |
|  | HEMA (parts by mass) | — | — | — | — | — | — | — |
|  | AA (parts by mass) | 1 | 3 | 2 | 1 | 2 | 14 | 1 |
|  | TA (parts by mass) | 3 | 2 | 2 | 2 | 3 | 5 | 3 |
|  | AN (parts by mass) | 12 | 11 | 6 | — | 10 | 12 | 12 |
|  | BD (parts by mass) | 49 | 49 | 49 | 49 | 49 | 34 | 49 |
|  | ST (parts by mass) | 23 | 28 | 31 | 48 | 25 | 23 | 23 |
| Preservative | 2-Methyl-4-isothiazolin-3-one (ppm) | — | — | 100 | — | — | — | — |
|  | 2-n-Octyl-4-isothiazolin-3-one (ppm) | — | 50 | — | — | — | 900 | — |
|  | 5-Chloro-2-methyl-4-isothiazolin-3-one (ppm) | 100 | — | — | 190 | — | — | — |
|  | 1,2-Benzisothiazolin-3-one (ppm) | — | — | — | — | 130 | — | — |
|  | Liquid medium (B) | Water | Water | Water | Water | Water | Water | Water |
| Properties of polymer particles | Number average particle size (nm) | 90 | 90 | 90 | 90 | 200 | 200 | 200 |
|  | THF-insoluble content (%) | 90 | 90 | 90 | 90 | 90 | 90 | 90 |
|  | Tg (° C.) | −20 | −20 | −20 | −20 | −20 | 16 | −20 |

|  |  | Synthesis Example 19 | Synthesis Example 20 | Synthesis Example 21 | Synthesis Example 22 | Synthesis Example 23 | Synthesis Example 24 |
| --- | --- | --- | --- | --- | --- | --- | --- |
|  | Polymer composition | S8 | S9 | S10 | S11 | S12 | S13 |
| Composition of polymer particles (A) | MMA (parts by mass) | 12 | 12 | 12 | 12 | 12 | 9 |
|  | HEMA (parts by mass) | 3 | — | 3 | 3 | 3 | — |
|  | AA (parts by mass) | 1 | 1 | 1 | 1 | 1 | 1 |
|  | TA (parts by mass) | 3 | 3 | 3 | 3 | 3 | 2 |
|  | AN (parts by mass) | 12 | 12 | 12 | 12 | 12 | 7 |
|  | BD (parts by mass) | 49 | 49 | 49 | 42 | 34 | 49 |
|  | ST (parts by mass) | 20 | 23 | 20 | 27 | 35 | 32 |
| Preservative | 2-Methyl-4-isothiazolin-3-one (ppm) | — | — | — | — | — | — |
|  | 2-n-Octyl-4-isothiazolin-3-one (ppm) | — | 40 | 1,700 | — | — | — |
|  | 5-Chloro-2-methyl-4-isothiazolin-3-one (ppm) | — | — | — | — | — | 200 |
|  | 1,2-Benzisothiazolin-3-one (ppm) | 500 | — | — | 500 | 500 | — |
|  | Liquid medium (B) | Water | Water | Water | Water | Water | Water |
| Properties of polymer particles | Number average particle size (nm) | 120 | 200 | 90 | 120 | 90 | 90 |
|  | THF-insoluble content (%) | 90 | 90 | 91 | 90 | 90 | 90 |
|  | Tg (° C.) | −20 | −20 | −21 | −1 | 16 | −20 |

TABLE 3

|  |  | Synthesis Example 12 | Synthesis Example 13 | Synthesis Example 14 | Synthesis Example 15 | Synthesis Example 16 | Synthesis Example 17 | Synthesis Example 18 |
| --- | --- | --- | --- | --- | --- | --- | --- | --- |
| First-step polymerization component | AN (parts) | 0.0 | 0.0 | 0.0 | 0.0 | 0.0 | 0.0 | 0.0 |
|  | HEMA (parts) | 0.0 | 0.0 | 0.0 | 0.0 | 0.0 | 0.0 | 0.0 |
|  | BD (parts) | 6.7 | 6.7 | 6.7 | 6.7 | 6.7 | 6.7 | 6.7 |
|  | ST (parts) | 12.0 | 12.0 | 12.0 | 14.6 | 12.0 | 9.0 | 12.0 |
|  | MMA (parts) | 2.6 | 2.6 | 2.6 | 0.0 | 2.6 | 2.6 | 2.6 |
|  | AA (parts) | 0.59 | 1.00 | 1.00 | 0.50 | 1.00 | 3.50 | 0.59 |
|  | TA (parts) | 2.35 | 1.50 | 1.50 | 1.50 | 2.50 | 2.30 | 2.35 |
|  | Total (first step) | 24.2 | 23.8 | 23.8 | 23.3 | 24.8 | 24.1 | 24.2 |
| Second-step polymerization component | AN (parts) | 12.0 | 11.0 | 6.0 | 0.0 | 10.0 | 12.0 | 12.0 |
|  | HEMA (parts) | 0.0 | 0.0 | 0.0 | 0.0 | 0.0 | 0.0 | 0.0 |
|  | BD (parts) | 42.3 | 42.3 | 42.3 | 42.3 | 42.3 | 27.3 | 42.3 |
|  | ST (parts) | 11.0 | 16.0 | 19.0 | 33.4 | 13.0 | 14.0 | 11.0 |
|  | MMA (parts) | 9.6 | 4.4 | 7.4 | 0.0 | 8.4 | 9.6 | 9.6 |
|  | AA (parts) | 0.36 | 2.00 | 1.00 | 0.50 | 1.00 | 10.00 | 0.36 |
|  | TA (parts) | 0.50 | 0.50 | 0.50 | 0.50 | 0.50 | 3.00 | 0.50 |
|  | Total (second step) | 75.8 | 76.2 | 76.2 | 76.7 | 75.2 | 75.9 | 75.8 |
| Total ratio of polymerization component (first step + | AN (parts) | 12.0 | 11.0 | 6.0 | 0.0 | 10.0 | 12.0 | 12.0 |
|  | HEMA (parts) | 0.0 | 0.0 | 0.0 | 0.0 | 0.0 | 0.0 | 0.0 |
|  | BD (parts) | 49.0 | 49.0 | 49.0 | 49.0 | 49.0 | 34.0 | 49.0 |
|  | ST (parts) | 23.0 | 28.0 | 31.0 | 48.0 | 25.0 | 23.0 | 23.0 |

TABLE 3-continued

|  |  |  |  |  |  |  |  |  |
|---|---|---|---|---|---|---|---|---|
| second step) | MMA (parts) | 12.2 | 7.0 | 10.0 | 0.0 | 11.0 | 12.2 | 12.2 |
|  | AA (parts) | 0.95 | 3.00 | 2.00 | 1.00 | 2.00 | 13.50 | 0.95 |
|  | TA (parts) | 2.85 | 2.00 | 2.00 | 2.00 | 3.00 | 5.30 | 2.85 |
| Total (first step + second step) |  | 100.0 | 100.0 | 100.0 | 100.0 | 100.0 | 100.0 | 100.0 |

|  |  | Synthesis Example 19 | Synthesis Example 20 | Synthesis Example 21 | Synthesis Example 22 | Synthesis Example 23 | Synthesis Example 24 |
|---|---|---|---|---|---|---|---|
| First-step polymerization component | AN (parts) | 0.0 | 0.0 | 0.0 | 0.0 | 0.0 | 0.0 |
|  | HEMA (parts) | 0.0 | 0.0 | 0.0 | 0.0 | 0.0 | 0.0 |
|  | BD (parts) | 6.7 | 6.7 | 6.7 | 6.7 | 6.7 | 6.7 |
|  | ST (parts) | 12.0 | 12.0 | 12.0 | 12.0 | 12.0 | 12.0 |
|  | MMA (parts) | 2.6 | 2.6 | 2.6 | 2.6 | 2.6 | 2.6 |
|  | AA (parts) | 0.59 | 0.59 | 0.59 | 0.59 | 0.59 | 0.50 |
|  | TA (parts) | 2.35 | 2.35 | 2.35 | 2.35 | 2.35 | 1.50 |
| Total (first step) |  | 24.2 | 24.2 | 24.2 | 24.2 | 24.2 | 23.3 |
| Second-step polymerization component | AN (parts) | 12.0 | 12.0 | 12.0 | 12.0 | 12.0 | 7.0 |
|  | HEMA (parts) | 3.0 | 0.0 | 3.0 | 3.0 | 3.0 | 0.0 |
|  | BD (parts) | 42.3 | 42.3 | 42.3 | 35.3 | 27.3 | 42.3 |
|  | ST (parts) | 8.0 | 11.0 | 8.0 | 15.0 | 23.0 | 20.0 |
|  | MMA (parts) | 9.6 | 9.6 | 9.6 | 9.6 | 9.6 | 6.4 |
|  | AA (parts) | 0.36 | 0.36 | 0.36 | 0.36 | 0.36 | 0.50 |
|  | TA (parts) | 0.50 | 0.50 | 0.50 | 0.50 | 0.50 | 0.50 |
| Total (second step) |  | 75.8 | 75.8 | 75.8 | 75.8 | 75.8 | 76.7 |
| Total ratio of polymerization component (first step + second step) | AN (parts) | 12.0 | 12.0 | 12.0 | 12.0 | 12.0 | 7.0 |
|  | HEMA (parts) | 3.0 | 0.0 | 3.0 | 3.0 | 3.0 | 0.0 |
|  | BD (parts) | 49.0 | 49.0 | 49.0 | 42.0 | 34.0 | 49.0 |
|  | ST (parts) | 20.0 | 23.0 | 20.0 | 27.0 | 35.0 | 32.0 |
|  | MMA (parts) | 12.2 | 12.2 | 12.2 | 12.2 | 12.2 | 9.0 |
|  | AA (parts) | 0.95 | 0.95 | 0.95 | 0.95 | 0.95 | 1.00 |
|  | TA (parts) | 2.85 | 2.85 | 2.85 | 2.85 | 2.85 | 2.00 |
| Total (first step + second step) |  | 100.0 | 100.0 | 100.0 | 100.0 | 100.0 | 100.0 |

The details of the abbreviation for each component listed in Tables 2 and 3 are as follows.
MMA: methyl methacrylate
HEMA: 2-hydroxyethyl methacrylate
AA: acrylic acid
TA: itaconic acid
AN: acrylonitrile
BD: 1,3-butadiene
ST: styrene

5.7. Synthesis Example 25

An autoclave (internal volume: about 6 L) equipped with an electromagnetic stirrer in which the internal atmosphere had been sufficiently replaced by nitrogen, was charged with 2.5 L of deoxidized purified water and 25 g of ammonium perfluorodecanoate (emulsifier), and the mixture was heated to 60° C. with stirring (350 rpm). A mixed gas including vinylidene fluoride (VDF) (44.2%) and hexafluoropropylene (HFP) (55.8%) was added to the autoclave until the internal pressure reached 20 kg/cm$^2$G. 25 g of a fluorocarbon 113 solution including diisopropyl peroxydicarbonate (initiator) (20%) was injected into the autoclave using nitrogen gas to initiate polymerization. The pressure was maintained at 20 kg/cm$^2$G during polymerization by successively injecting a mixed gas including VDF (60.2%) and HFP (39.8%). Since the polymerization rate decreased along with the progress of polymerization, 25 g of a fluorocarbon 113 solution including diisopropyl peroxydicarbonate (20%) was injected again using nitrogen gas when 3 hours had elapsed, and the polymerization reaction was effected for a further 3 hours. The reaction mixture was cooled without stirring, and unreacted monomers were removed to terminate the reaction to obtain a fluoropolymer latex.

A 7 L separable flask in which the internal atmosphere had been sufficiently replaced by nitrogen, was charged with 150 parts by mass (on a solid basis) of the fluoropolymer latex and 3 parts by mass ammonium 2-(1-allyl)-4-nonylphenoxy polyethylene glycol sulfate (emulsifier), and the mixture was heated to 75° C. After the addition of 60 parts by mass of n-butyl acrylate, 36 parts by mass of methyl methacrylate, 4 parts by mass of sodium styrenesulfonate, and a proper quantity of water, the mixture was stirred at 75° C. for 30 minutes. After the addition of 0.5 parts by mass of sodium persulfate (initiator), a polymerization was effected at 85 to 95° C. for 2 hours. The mixture was then cooled to terminate the reaction to obtain a an aqueous dispersion including a composite polymer including a fluoropolymer and a sulfonic acid group-containing polymer.

NMP was added to the aqueous dispersion in a ratio of 900 parts by mass based on 100 parts by mass (on a solid basis) of the aqueous dispersion. Water was removed by distillation under reduced pressure using a rotary evaporator (water temperature: 85° C.) to obtain an NMP solution including a polymer (A). A polymer composition F12 was prepared in the same manner as in Synthesis Example 1 (see "5.1.2. Preparation of polymer composition"), except that the type and the amount of polymer (A) and the type and the amount of preservative were changed as listed in Table 4, and the NMP solution including the polymer (A) was used instead of the aqueous dispersion.

5.8. Synthesis Examples 26 to 30

An NMP solution including the polymer (A) listed in Table 4 was obtained in the same manner as in Synthesis Example 25, except that the types and the amounts (parts by mass) of monomers were changed as listed in Table 4, and the ratio of the first-step polymerization components and the second-step polymerization components used to produce the polymer (A) was changed as listed in Table 4. Polymer compositions F13 to F17 were prepared in the same manner as in Synthesis Example 25, except that the resulting NMP solution was used.

able lithium iron phosphate (LiFePO$_4$) using an agate mortar, and classifying the product using a sieve), 5 parts by mass of acetylene black, and 68 parts by mass of water. The mixture was stirred at 60 rpm for 1 hour. The electrical storage device binder composition prepared as described above (see "5.9.1. Preparation of electrical storage device

TABLE 4

| | | Synthesis Example 25 | Synthesis Example 26 | Synthesis Example 27 | Synthesis Example 28 | Synthesis Example 29 | Synthesis Example 30 |
|---|---|---|---|---|---|---|---|
| | Polymer composition | F12 | F13 | F14 | F15 | F16 | F17 |
| First-step polymerization component | VDF (parts by mass) | 53 | 53 | 53 | 70 | 53 | 53 |
| | HFP (parts by mass) | 47 | 47 | 47 | 30 | 47 | 47 |
| Second-step polymerization component | nBA (parts by mass) | 60 | 60 | 60 | 45 | 60 | 60 |
| | MMA (parts by mass) | 36 | 30 | 29.8 | 30 | 36 | 36 |
| | ST (parts by mass) | — | 6 | 10 | 6 | — | — |
| | IA (parts by mass) | — | — | — | 3 | — | — |
| | ATBS (parts by mass) | — | 4 | — | — | — | — |
| | NMAM (parts by mass) | — | — | — | — | 4 | — |
| | NASS (parts by mass) | 4 | — | 0.2 | 15 | — | 23 |
| | GMA (parts by mass) | — | — | — | 1 | — | — |
| Preservative | 2-Methyl-4-isothiazolin-3-one (ppm) | — | — | 100 | — | — | — |
| | 2-n-Octyl-4-isothiazolin-3-one (ppm) | — | 50 | — | — | — | 900 |
| | 5-Chloro-2-methyl-4-isothiazolin-3-one (ppm) | 100 | — | — | 190 | — | — |
| | 1,2-Benzisothiazolin-3-one (ppm) | — | — | — | — | 130 | — |
| | Liquid medium (B) | NMP | NMP | NMP | NMP | NMP | NMP |

The details of the abbreviation for each component listed in Table 4 are as follows.
VDF: vinylidene fluoride
HFP: hexafluoropropylene
nBA: n-butyl acrylate
MMA: methyl methacrylate
ST: styrene
IA: itaconic acid
ATBS: 2-acrylamide-2-methylpropanesulfonic acid
NMAM: N-methylolacrylamide
NASS: sodium styrenesulfonate
GMA: glycidyl methacrylate Note that a polymer composition F18 was prepared in the same manner as in Synthesis Example 25, except that an NMP solution including PVdF ("#7305" manufactured by Kureha Battery Materials Japan Co., Ltd., 5% NMP solution, molecular weight: 1,000,000 or more) was used instead of the polymer used in Synthesis Example 25.

5.9. Example 1

5.9.1. Preparation of Electrical Storage Device Binder Composition

An iron powder having a particle size of 20 micrometers or less (classified using a sieve in advance) was added to the polymer composition F1 prepared as described above (see "5.1.2. Preparation of polymer composition"), and the mixture was stirred. The mixture was passed through a magnet filter (magnetic field: 1.7 T, flow rate: 15 kg/min) to remove large iron particles. The resulting electrical storage device binder composition was observed using a microscope to measure the particle size and the number of iron particles.

5.9.2. Preparation of Electrode Slurry

A twin-screw planetary mixer ("TK HIVIS MIX 2P-03" manufactured by PRIMIX Corporation) was charged with 1 part by mass (on a solid basis) of a thickener ("CMC1120" manufactured by Daicel Corporation), 100 parts by mass of an electrode active material (particle size (D50): 0.5 micrometers) (prepared by pulverizing commercially-availbinder composition") was added to the mixture so that the ratio of the polymer particles was 1 part by mass, and the resulting mixture was stirred for 1 hour to obtain a paste. After the addition of water to the paste to adjust the solid content to 50%, the resulting mixture was stirred at 200 rpm for 2 minutes, stirred at 1,800 rpm for 5 minutes, and stirred at 1,800 rpm for 1.5 minutes under vacuum (about $5.0 \times 10^3$ Pa) using a stirrer/deaerator ("THINKY Mixer (Awatori Rentarou)" manufactured by THINKY Corporation) to prepare an electrode slurry.

5.9.3. Production of Electrical Storage Device Electrode

The electrode slurry prepared as described above (see "5.9.2. Preparation of electrode slurry") was uniformly applied to the surface of a collector (aluminum foil, thickness: 30 micrometers) using a doctor blade method so that a film obtained by drying the applied electrode slurry had a thickness of 100 micrometers, and dried at 120° C. for 20 minutes. The resulting film was pressed using a roll press so that the resulting film (electrode active material layer) had a density of 1.9 g/cm$^3$ to obtain an electrical storage device electrode (positive electrode).

5.9.4. Production and Evaluation of electrical Storage Device

<Production of Counter Electrode (Negative Electrode)>

A twin-screw planetary mixer ("TK HIVIS MIX 2P-03" manufactured by PRIMIX Corporation) was charged with 4 parts by mass (on a solid basis) of polyvinylidene fluoride (PVDF), 100 parts by mass (on a solid basis) of graphite (negative electrode active material), and 80 parts by mass of N-methylpyrrolidone (NMP), and the mixture was stirred at 60 rpm for 1 hour. After the addition of 20 parts by mass of NMP, the resulting mixture was stirred at 200 rpm for 2 minutes, stirred at 1,800 rpm for 5 minutes, and stirred at 1,800 rpm for 1.5 minutes under vacuum using a stirrer/deaerator ("THINKY Mixer (Awatori Rentarou)" manufactured by THINKY Corporation) to prepare a counter electrode (negative electrode) slurry.

The counter electrode (negative electrode) slurry prepared as described above was uniformly applied to the surface of a collector (copper foil) using a doctor blade method so that a film obtained by drying the applied slurry had a thickness of 150 micrometers, and dried at 120° C. for 20 minutes. The resulting film was pressed using a roll press so that the film had a density of 1.5 g/cm³ to obtain a counter electrode (negative electrode).

<Assembly of Lithium-Ion Battery cell>

In a gloved box in which the internal atmosphere had been replaced by Ar so that the dew point was −80° C., a negative electrode (diameter: 15.95 mm) prepared by punching the negative electrode produced as described above was placed on a two-electrode coin cell ("HS Flat Cell" manufactured by Hohsen Corp.). A separator ("Celgard #2400" manufactured by Celgard, LLC.) (diameter: 24 mm) prepared by punching a polypropylene porous membrane was placed on the negative electrode, and 500 microliters of an electrolyte solution was injected into the two-electrode coin cell while avoiding the entry of air. A positive electrode (diameter: 16.16 mm) prepared by punching the positive electrode produced as described above was placed on the separator, and the outer casing of the two-electrode coin cell was air-tightly sealed using a screw to assemble a lithium-ion battery cell (electrical storage device). Note that the electrolyte solution was prepared by dissolving $LiPF_6$ in an ethylene carbonate/ethylmethyl carbonate (mass ratio=1/1) solvent at a concentration of 1 mol/L.

<Evaluation of Capacity Retention Ratio>

The lithium-ion secondary battery produced as described above was charged at a constant current (1 C), charged at a constant voltage (4.2 V) when the voltage had reached 4.2 V, and determined to be fully charged (cut-off) when the current value had reached 0.01 C. The lithium-ion secondary battery was then discharged at a constant current (1 C), and determined to be fully discharged (cut-off) when the voltage had reached 3.0 V, and the discharge capacity in the first cycle was calculated. The charge-discharge operation was repeated 50 times, and the discharge capacity in the fiftieth cycle was calculated. A value obtained by dividing the discharge capacity in the fiftieth cycle by the discharge capacity in the first cycle was taken as the discharge capacity retention ratio (%). The results are listed in Table 5. The discharge capacity retention ratio was determined to be acceptable when the discharge capacity retention ratio was 80% or more.

Note that "1 C" refers to a current value at which a cell having a given electrical capacity is fully discharged in 1 hour by constant-current discharge. For example, "0.1 C" refers to a current value at which the cell is fully discharged in 10 hours, and "10 C" refers to a current value at which the cell is fully discharged in 0.1 hours.

<Evaluation of Decrease in Voltage at High Temperature>

The lithium-ion secondary battery produced as described above was charged (25° C.) at a constant current (1 C), charged at a constant voltage (4.2 V) when the voltage had reached 4.2 V, and determined to be fully charged when the current value had reached 0.01 C. After measuring the battery voltage, the battery was put in a container (PP container) provided with an insulating partition, and stored in a thermostat bath at 60° C. for 2 weeks. The battery was removed from the thermostat bath, and then allowed to stand in a thermostat bath at 25° C. for 3 hours, and the battery voltage was measured. The difference in voltage due to storage (=battery voltage before high-temperature storage−battery voltage after high-temperature storage) was calculated to evaluate the decrease in voltage (mV) at a high temperature. The decrease in voltage (mV) at a high temperature thus measured is listed in Table 5. The decrease in voltage was evaluated as acceptable when the decrease in voltage was 50 mV or less.

5.10. Examples 2 to 26 and Comparative Examples 1 to 6

An electrical storage device binder composition, an electrical storage device electrode, and an electrical storage device were prepared (produced) and evaluated in the same manner as in Example 1, except that the polymer composition and the conditions listed in Table 5 were used (see "5.9.1. Preparation of electrical storage device binder composition"). The results are listed in Table 5. Note that the SUS powder (SUS430) (particle size: 20 micrometers or less, classified using a sieve in advance) was passed through a magnet filter to remove large SUS particles in the same manner as in Example 1.

TABLE 5

|  |  | Example 1 | Example 2 | Example 3 | Example 4 | Example 5 | Example 6 | Example 7 | Example 8 |
|---|---|---|---|---|---|---|---|---|---|
| Electrical storage device binder composition | Polymer composition (parts by mass) | F1 100 | F2 100 | F3 100 | F4 100 | F5 100 | F6 100 | F7 100 | F8 100 |
|  | Polymer composition (parts by mass) |  |  |  |  |  |  |  |  |
|  | Particles having particle size of 10 to 50 micrometers | Iron powder | Iron powder | Iron powder | Iron powder | Iron powder | Iron powder | Iron powder | Iron powder |
|  | Number of particles per mL | 10,000 | 10,000 | 10,000 | 10,000 | 10,000 | 10,000 | 10,000 | 10,000 |
| Characteristics of electrical storage device | Capacity retention ratio (%) | 89 | 88 | 87 | 89 | 88 | 87 | 87 | 88 |
|  | Decrease in voltage at high temperature (mV) | 31 | 34 | 32 | 33 | 35 | 37 | 33 | 34 |

|  |  | Example 9 | Example 10 | Example 11 | Example 12 | Example 13 | Example 14 | Example 15 | Example 16 |
|---|---|---|---|---|---|---|---|---|---|
| Electrical storage device | Polymer composition (parts by mass) | F9 | F10 100 | F11 100 | F1 50 | F1 30 | F1 10 | F1 80 | F1 100 |
|  | Polymer composition |  |  |  | F5 | F5 | F5 | F5 |  |

TABLE 5-continued

| binder composition | (parts by mass) | | | | 50 | 70 | 90 | 20 | |
|---|---|---|---|---|---|---|---|---|---|
| | Particles having particle size of 10 to 50 micrometers | Iron powder | Iron powder | Iron powder | Iron powder | Iron powder | Iron powder | Iron powder | Iron powder |
| | Number of particles per mL | 10,000 | 10,000 | 1,000 | 10,000 | 10,000 | 10,000 | 10,000 | 1,000 |
| Characteristics of electrical storage device | Capacity retention ratio (%) | 89 | 88 | 89 | 88 | 87 | 87 | 88 | 89 |
| | Decrease in voltage at high temperature (mV) | 36 | 32 | 31 | 35 | 37 | 33 | 34 | 31 |

| | | Example 17 | Example 18 | Example 19 | Example 20 | Example 21 | Example 22 | Example 23 | Example 24 |
|---|---|---|---|---|---|---|---|---|---|
| Electrical storage device binder composition | Polymer composition (parts by mass) | F1 100 | F1 100 | F2 100 | F12 100 | F13 100 | F14 100 | F15 100 | F16 100 |
| | Polymer composition (parts by mass) | | | | | | | | |
| | Particles having particle size of 10 to 50 micrometers | Iron powder | SUS powder | SUS powder | Iron powder | Iron powder | Iron powder | Iron powder | SUS powder |
| | Number of particles per mL | 100,000 | 1,000 | 10,000 | 10,000 | 10,000 | 1,000 | 10,000 | 10,000 |
| Characteristics of electrical storage device | Capacity retention ratio (%) | 87 | 89 | 88 | 88 | 87 | 89 | 88 | 88 |
| | Decrease in voltage at high temperature (mV) | 39 | 33 | 35 | 31 | 34 | 32 | 35 | 33 |

| | | Example 25 | Example 26 | Comparative Example 1 | Comparative Example 2 | Comparative Example 3 | Comparative Example 4 | Comparative Example 5 | Comparative Example 6 |
|---|---|---|---|---|---|---|---|---|---|
| Electrical storage device binder composition | Polymer composition (parts by mass) | F17 100 | F18 100 | F1 100 | F1 100 | F1 100 | F1 100 | F15 100 | F15 100 |
| | Polymer composition (parts by mass) | | | | | | | | |
| | Particles having particle size of 10 to 50 micrometers | SUS powder | Iron powder | Iron powder | Iron powder | Iron powder | Iron powder | Iron powder | Iron powder |
| | Number of particles per mL | 10,000 | 10,000 | 0 | 500 | 500,000 | 1,000,000 | 500 | 1,000,000 |
| Characteristics of electrical storage device | Capacity retention ratio (%) | 87 | 85 | 72 | 78 | 65 | 51 | 74 | 54 |
| | Decrease in voltage at high temperature (mV) | 35 | 38 | 31 | 35 | 255 | 650 | 38 | 700 |

5.11. Example 27

5.11.1. Preparation of Electrical Storage Device Binder Composition

An electrical storage device binder composition was prepared in the same manner as in Example 1, except that the composition was changed as listed in Table 6.

5.11.2. Preparation of Electrode Slurry

A twin-screw planetary mixer ("TK HIVIS MIX 2P-03" manufactured by PRIMIX Corporation) was charged with 1 part by mass (on a solid basis) of a thickener ("CMC2200" manufactured by Daicel Corporation), 100 parts by mass (on a solid basis) of graphite (negative electrode active material), and 68 parts by mass of water, and the mixture was stirred at 60 rpm for 1 hour. After the addition of 2 parts by mass (on a solid basis) of the electrical storage device binder composition prepared as described (see "5.11.1. Preparation of electrical storage device binder composition"), the resulting mixture was stirred for 1 hour to obtain a paste. After the addition of water to the paste to adjust the solid content to 50%, the resulting mixture was stirred at 200 rpm for 2 minutes, stirred at 1,800 rpm for 5 minutes, and then stirred at 1,800 rpm for 1.5 minutes under vacuum using a stirrer/deaerator ("THINKY Mixer (Awatori Rentarou)" manufactured by THINKY Corporation) to prepare an electrode slurry.

5.11.3. Production of Electrical Storage Device Electrode

The electrode slurry prepared as described above (see "5.11.2. Preparation of electrode slurry") was uniformly applied to the surface of a collector (copper foil, thickness: 20 micrometers) using a doctor blade method so that a film obtained by drying the applied electrode slurry had a thickness of 80 micrometers, and dried at 120° C. for 20 minutes. The resulting film was pressed using a roll press so that the resulting electrode layer had a density of 1.5 g/cm$^3$ to obtain an electrode (negative electrode).

5.11.4. Production and Evaluation of Electrical Storage Device

<Production of Counter Electrode (Positive Electrode)>

A twin-screw planetary mixer ("TK HIVIS MIX 2P-03" manufactured by PRIMIX Corporation) was charged with 4.0 parts by mass (on a solid basis) of an electrochemical device electrode binder ("KF Polymer #1120" manufactured by Kureha Corporation), 3.0 parts by mass of a conductive aid ("DENKA BLACK" 50% pressed product, manufactured by Denki Kagaku Kogyo Kabushiki Kaisha), 100 parts by mass of LiCoO$_2$ (particle size: 5 micrometers, manufactured by Hayashi Kasei Co., Ltd.) (positive electrode active material), and 36 parts by mass of N-methylpyrrolidone (NMP). The mixture was stirred at 60 rpm for 2 hours to prepare a paste. After the addition of NMP to the paste to adjust the solid content to 65%, the mixture was stirred at 200 rpm for 2 minutes, stirred at 1,800 rpm for 5 minutes, and stirred at 1,800 rpm for 1.5 minutes under vacuum using a stirrer/deaerator ("THINKY Mixer (Awatori Rentarou)" manufactured by THINKY Corporation) to prepare an electrode slurry. The electrode slurry was uniformly applied to the surface of a collector (aluminum foil) using a doctor blade method so that a film obtained by drying the applied electrode slurry had a thickness of 80 micrometers, and dried at 120° C. for 20 minutes. The resulting film was pressed using a roll press so that the resulting electrode layer had a density of 3.0 g/cm$^3$ to obtain a counter electrode (positive electrode).

<Assembly of Lithium-Ion Battery Cell>

In a gloved box in which the internal atmosphere had been replaced by Ar so that the dew point was −80° C., a negative electrode (diameter: 15.95 mm) prepared by punching the negative electrode produced as described above was placed on a two-electrode coin cell ("HS Flat Cell" manufactured by Hohsen Corp.). A separator ("Celgard #2400" manufactured by Celgard, LLC.) (diameter: 24 mm) prepared by punching a polypropylene porous membrane was placed on the negative electrode, and 500 microliters of an electrolyte solution was injected into the two-electrode coin cell while avoiding the entry of air. A positive electrode (diameter: 16.16 mm) prepared by punching the positive electrode produced as described above was placed on the separator, and the outer casing of the two-electrode coin cell was air-tightly sealed using a screw to assemble a lithium-ion battery cell (electrical storage device). Note that the electrolyte solution was prepared by dissolving LiPF$_6$ in an ethylene carbonate/ethylmethyl carbonate (mass ratio=1/1) solvent at a concentration of 1 mol/L.

<Evaluation Method>

The capacity retention ratio and a decrease in voltage at a high temperature were evaluated in the same manner as in Example 1 (see "5.9.4. Production and evaluation of electrical storage device" ("Evaluation of capacity retention ratio" and "Evaluation of decrease in voltage at high temperature")). The results are listed in Table 6.

5.12. Examples 28 to 54 and Comparative Examples 7 to 10

An electrical storage device binder composition, an electrical storage device electrode, and an electrical storage device were prepared (produced) and evaluated in the same manner as in Example 1, except that the polymer composition and the conditions listed in Table 6 were used (see "5.9.1. Preparation of electrical storage device binder composition"). The results are listed in Table 6.

In Example 54, a polymer composition S14 was prepared in the same manner as in Synthesis Example 1, except that polyacrylic acid ("185012500" manufactured by ACROS, average molecular weight: 240,000) was used instead of the polymer used in Synthesis Example 1, and an electrical storage device electrode and an electrical storage device were produced and evaluated in the same manner as in Example 1. The results are listed in Table 6.

TABLE 6

| | | Example 27 | Example 28 | Example 29 | Example 30 | Example 31 | Example 32 | Example 33 | Example 34 |
|---|---|---|---|---|---|---|---|---|---|
| Electrical storage device binder composition | Polymer composition (parts by mass) | S1<br>100 | S2<br>100 | S3<br>100 | S4<br>100 | S5<br>100 | S6<br>100 | S7<br>100 | S8<br>100 |
| | Polymer composition (parts by mass) | | | | | | | | |
| | Particles having particle size of 10 to 50 micrometers | Iron powder | Iron powder | Iron powder | Iron powder | Iron powder | Iron powder | Iron powder | Iron powder |
| | Number of particles per mL | 10,000 | 10,000 | 10,000 | 10,000 | 10,000 | 10,000 | 10,000 | 10,000 |
| Characteristics of electrical storage device | Capacity retention ratio (%) | 89 | 88 | 87 | 86 | 85 | 88 | 89 | 87 |
| | Decrease in voltage at high temperature (mV) | 31 | 34 | 33 | 34 | 34 | 38 | 34 | 35 |

| | | Example 35 | Example 36 | Example 37 | Example 38 | Example 39 | Example 40 | Example 41 | Example 42 |
|---|---|---|---|---|---|---|---|---|---|
| Electrical storage device binder composition | Polymer composition (parts by mass) | S9<br>100 | S10<br>100 | S11<br>100 | S12<br>100 | S13<br>100 | S1<br>50 | S1<br>30 | S1<br>10 |
| | Polymer composition (parts by mass) | | | | | | S5<br>50 | S5<br>70 | S5<br>90 |
| | Particles having particle size of 10 to 50 micrometers | Iron powder | Iron powder | Iron powder | Iron powder | Iron powder | Iron powder | Iron powder | Iron powder |
| | Number of particles per mL | 10,000 | 10,000 | 10,000 | 10,000 | 10,000 | 10,000 | 10,000 | 10,000 |
| Characteristics of electrical storage device | Capacity retention ratio (%) | 88 | 88 | 87 | 87 | 87 | 88 | 89 | 87 |
| | Decrease in voltage at high temperature (mV) | 36 | 34 | 35 | 35 | 35 | 38 | 34 | 35 |

TABLE 6-continued

|  |  | Example 43 | Example 44 | Example 45 | Example 46 | Example 47 | Example 48 | Example 49 | Example 50 |
|---|---|---|---|---|---|---|---|---|---|
| Electrical storage device binder composition | Polymer composition (parts by mass) | S1<br>80 | S1<br>50 | S1<br>30 | S1<br>10 | S1<br>80 | S1<br>50 | S1<br>30 | S1<br>10 |
|  | Polymer composition (parts by mass) | S5<br>20 | F1<br>50 | F1<br>70 | F1<br>90 | F1<br>20 | F8<br>50 | F8<br>70 | F8<br>90 |
|  | Particles having particle size of 10 to 50 micrometers | Iron powder | Iron powder | Iron powder | Iron powder | Iron powder | Iron powder | Iron powder | Iron powder |
|  | Number of particles per mL | 10,000 | 10,000 | 10,000 | 10,000 | 10,000 | 10,000 | 10,000 | 10,000 |
| Characteristics of electrical storage device | Capacity retention ratio (%) | 88 | 88 | 89 | 87 | 88 | 88 | 89 | 87 |
|  | Decrease in voltage at high temperature (mV) | 36 | 38 | 34 | 35 | 36 | 38 | 34 | 35 |

|  |  | Example 51 | Example 52 | Example 53 | Example 54 | Comparative Example 7 | Comparative Example 8 | Comparative Example 9 | Comparative Example 10 |
|---|---|---|---|---|---|---|---|---|---|
| Electrical storage device binder composition | Polymer composition (parts by mass) | S1<br>80 | S1<br>100 | S3<br>100 | S14<br>100 | S6<br>100 | S7<br>100 | S8<br>100 | S9<br>100 |
|  | Polymer composition (parts by mass) | F8<br>20 |  |  |  |  |  |  |  |
|  | Particles having particle size of 10 to 50 micrometers | Iron powder | Iron powder | Iron powder | Iron powder | Iron powder | Iron powder | Iron powder | Iron powder |
|  | Number of particles per mL | 10,000 | 1,000 | 100,000 | 1,000 | 0 | 500 | 500,000 | 1,000,000 |
| Characteristics of electrical storage device | Capacity retention ratio (%) | 88 | 89 | 87 | 85 | 72 | 78 | 65 | 51 |
|  | Decrease in voltage at high temperature (mV) | 36 | 31 | 39 | 35 | 31 | 35 | 255 | 650 |

5.13. Evaluation Results

As is clear from the results listed in Tables 4 and 5, the electrical storage devices (lithium-ion secondary batteries) of Example 1 to 54 produced using the electrical storage device binder composition according to the invention had an excellent capacity retention ratio. It is considered that an excellent capacity retention ratio was obtained since the particles (iron powder or SUS powder) were uniformly dispersed in the electrode, and the electron conductivity of the electrode was improved. A decrease in voltage during storage at a high temperature was evaluated as acceptable.

On the other hand, the electrical storage devices (lithium-ion secondary batteries) including the electrodes produced using the electrical storage device binder compositions of Comparative Example 1 to 10 had a low capacity retention ratio and a significant decrease in voltage at a high temperature. It is considered that the cycle characteristics were adversely affected since the iron powder was added so that the number of particles was 1,000 or less per mL, and the electrode had poor electron conductivity. It is considered that, when the iron powder was added so that the number of particles was more than 100,000 per mL, the iron powder deposited on the negative electrode active material passed through the separator, and a short circuit with the positive electrode occurred, whereby the cycle characteristics were impaired, and a significant decrease in voltage occurred during storage at a high temperature.

The invention is not limited to the embodiments described above, and various modifications and variations may be made of the embodiments described above. The invention includes various other configurations substantially the same as the configurations described above in connection with the embodiments (such as a configuration having the same function, method, and results, or a configuration having the same objective and results). The invention also includes configurations in which an unsubstantial element (part) described above in connection with the embodiments is replaced by another element (part). The invention also includes a configuration having the same effects as those of the configurations described above in connection with the embodiments, or a configuration capable of achieving the same objective as that of the configurations described above in connection with the embodiments. The invention further includes a configuration in which a known technique is added to the configurations described above in connection with the embodiments.

The invention claimed is:

1. A method for producing an electrical storage device electrode comprising:
    providing an electrode slurry which comprises:
    a polymer (A);
    a liquid medium (B);
    iron powder or stainless steel (SUS) powder having a particle size of 20 micrometers or less; and
    an electrode active material;
    wherein a content of the iron powder or SUS powder is from 1,000 to 100,000 particles per mL;
    applying the electrode slurry to a surface of a collector; and
    drying the electrode slurry that has been applied to the surface of the collector.

2. The method for producing an electrical storage device electrode according to claim 1, wherein the polymer (A) comprises a repeating unit (Mb) derived from an unsaturated carboxylic acid ester.

3. The method for producing an electrical storage device electrode according to claim 1, wherein the polymer (A) is a fluorine-containing polymer that comprises a repeating unit (Ma) derived from a fluorine-containing ethylene-based monomer.

4. The method for producing an electrical storage device electrode according to claim 3, wherein the fluorine-containing polymer is in a form of particles having an average particle size of 50 to 400 nm, and the particles are dispersed in the liquid medium (B).

5. The method for producing an electrical storage device electrode according to claim 1, wherein the polymer (A) is a diene-based polymer that comprises a repeating unit (Md) derived from a conjugated diene compound, a repeating unit (Me) derived from an aromatic vinyl compound, and a repeating unit (Mc) derived from an unsaturated carboxylic acid.

6. The method for producing an electrical storage device electrode according to claim 5, wherein the diene-based polymer is in a form of particles having an average particle size of 50 to 400 nm, and the particles are dispersed in the liquid medium (B).

* * * * *